(12) United States Patent
Ikushima et al.

(10) Patent No.: US 7,927,246 B2
(45) Date of Patent: Apr. 19, 2011

(54) VEHICULAR DRIVE FORCE DISTRIBUTION DEVICE

(75) Inventors: Yoshihiro Ikushima, Okazaki (JP); Kazuhiko Yuasa, Toyota (JP); Hideki Tamoto, Toyota (JP); Hirokazu Suzuki, Toyota (JP); Akifumi Miyazaki, Toyota (JP); Koji Ando, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 332 days.

(21) Appl. No.: 12/224,717

(22) PCT Filed: Apr. 3, 2007

(86) PCT No.: PCT/IB2007/001457
§ 371 (c)(1),
(2), (4) Date: Sep. 4, 2008

(87) PCT Pub. No.: WO2008/041068
PCT Pub. Date: Apr. 10, 2008

(65) Prior Publication Data
US 2009/0186738 A1    Jul. 23, 2009

(30) Foreign Application Priority Data
Apr. 5, 2006  (JP) ................. 2006-104704

(51) Int. Cl.
*F16H 48/06* (2006.01)
(52) U.S. Cl. ...................................... 475/222
(58) Field of Classification Search .............. None
See application file for complete search history.

(56) References Cited

U.S. PATENT DOCUMENTS

| | | | |
|---|---|---|---|
| 4,973,296 A * | 11/1990 | Shibahata | 475/231 |
| 5,370,588 A | 12/1994 | Sawase et al. | |
| 5,415,598 A * | 5/1995 | Sawase et al. | 475/86 |
| 5,692,987 A * | 12/1997 | Shibahata et al. | 475/204 |
| 6,120,407 A | 9/2000 | Mimura | |
| 6,854,571 B2 | 2/2005 | Iwazaki et al. | |
| 7,044,880 B2 | 5/2006 | Bowen | |
| 7,086,982 B2 * | 8/2006 | Bowen | 475/225 |
| 7,811,194 B2 * | 10/2010 | Bowen | 475/201 |
| 2001/0035324 A1 | 11/2001 | Okuma et al. | |

FOREIGN PATENT DOCUMENTS

DE  10 2004 025 005 A1   9/2005
JP     A-11-105573        4/1999

* cited by examiner

*Primary Examiner* — Dirk Wright
(74) *Attorney, Agent, or Firm* — Oliff & Berridge, PLC

(57) ABSTRACT

The rotation of a first rotating element is shifted in speed by a speed shift device, and is transmitted to a second rotating element or a third rotating element of a differential device via a first clutch or a second clutch. In this manner, the torque of right and left driving wheels can be controlled. Furthermore, in conjunction with limitation of the differential motion, the amount of torque transmitted to a fourth rotating element is eliminated by allowing the speed shift device to freely rotate, and the accumulated amount of sliding of friction engagement elements at the time of differential motion limitation can be reduced by completely engaging the first clutch and the second clutch without allowing them to slide. Thus, the differential motion limitation control can be realized without a need to increase the size of the first clutch and the second clutch.

27 Claims, 10 Drawing Sheets

VEHICULAR DRIVE FORCE DISTRIBUTION DEVICE

BACKGROUND OF THE INVENTION

1. Field of the Invention

The disclosure of Japanese Patent Application No. 2006-104704 filed on Apr. 5, 2006, including the specification, drawings and abstract is incorporated herein by reference in its entirety.

2. Description of the Related Art

There is a known vehicular drive force distribution device that distributes the drive force generated by a drive source to right and left driving wheels. An example thereof is a vehicular drive force distribution device described in Japanese Patent Application Publication No. JP-A-11-105573. According to this technology, the drive force transmitted from the drive source is distributed to right and left driving wheels by a differential device that is made up of a planetary gear device. Furthermore, in this technology, a speed shift mechanism combining a pair of planetary gear devices is disposed adjacent to and coaxially with the differential device. The speed shift mechanism is provided with a pair of clutches for transmitting the output of the speed change mechanism selectively to a carrier and a sun gear of the differential device. By selectively putting the two clutches into slipping engagement in accordance with need at the time of cornering or the like, the drive force output via the speed shift mechanism is transmitted to the sun gear or the carrier of the differential device. The drive force is thus distributed.

However, if a limited differential motion control is to be adopted in the technology described in Japanese Patent Application Publication No. JP-A-11-105573, friction engagement elements of the two clutches have to be slid, so that the clutches need to be large in size. Furthermore, the durability of the clutches imposes a limitation. Therefore, it is substantially difficult to realize a differential motion limitation control in conjunction with the foregoing technology.

SUMMARY OF THE INVENTION

The invention has been accomplished against the background of the aforementioned circumstances, and provides a vehicular drive force distribution device capable of a limited differential motion control as well as a torque difference control of right and left driving wheels.

According to an aspect of the invention, there is provided (a) a vehicular drive force distribution device that distributes drive force generated by a drive source to right and left driving wheels, characterized by including: (b) differential portion having a first rotating element to which the drive force generated by the drive source is transmitted, a second rotating element connected to one of the right and left driving wheels, and a third rotating element connected to another one of the right and left driving wheels; (c) a speed shift portion that shifts speed of rotation of the first rotating element and selectively outputs the rotation from a fourth rotating element; (d) a first clutch that transmits rotation from the fourth rotating element to the second rotating element so that amount of torque transmitted is variable; and (e) a second clutch that transmits rotation from the fourth rotating element to the third rotating element so that the amount of torque transmitted is variable, (f) wherein the speed shift portion is capable of changing the amount of torque transmitted to the fourth rotating element.

According to the vehicular drive force distribution device structured as described above, the rotation of the first rotating element that is rotated by the drive force transmitted from the drive source is shifted in speed by the speed shift portion, and is transmitted to the second rotating element or the third rotating element of the differential portion via the first clutch or the second clutch. In this manner, the torque difference control of the right and left driving wheels becomes possible. Furthermore, by allowing the speed shift portion to freely rotate, the amount of torque transmitted to the fourth rotating element can be eliminated. By fully engaging the first and second clutches, the differential motion limitation can be fully performed. Therefore, the accumulated amount of sliding of the friction engagement elements at the time of differential motion limitation can be reduced, and the differential motion limitation control can be realized without a need to increase the size of the first and second clutches.

Furthermore, in the vehicular drive force distribution device, it is preferable that the speed shift portion be constructed of a planetary gear device that includes the fourth rotating element, a fifth rotating element linked to the first rotating element, and a sixth rotating element, and that the speed shift portion include a brake capable of braking rotation of the sixth rotating element.

According to the vehicular drive force distribution device structured as described above, since the speed shift portion includes the brake capable of braking the rotation of the sixth rotating element, the speed shift portion assumes a speed shifted state by establishing the engagement or half-engagement of the brake, so that the drive force is distributed.

In the vehicular drive force distribution device, it is preferable that in the speed shift portion, the fourth rotating element be a ring gear, and the fifth rotating element be a sun gear, and the sixth rotating element be a carrier which rotatably supports pinions that mesh with the ring gear and the sun gear, and which is selectively linked to a non-rotating member via the brake.

According to the vehicular drive force distribution device structured as described above, since the speed shift portion has a structure that facilitates the disposition of the first and second clutches, the speed shift portion contributes to making a practical vehicular drive force distribution device.

Furthermore, in the vehicular drive force distribution device, it is also preferable that the planetary gear device be a single-pinion type planetary gear device.

According to the vehicular drive force distribution device structured as described above, since the planetary gear device is a single-pinion type planetary gear device, the planetary gear device provides relatively large speed change ratio, thus contributing to making a practical vehicular drive force distribution device.

Furthermore, in the vehicular drive force distribution device, it is also preferable that the planetary gear device be a double-pinion type planetary gear device.

According to the vehicular drive force distribution device structured as described above, since the planetary gear device is a double-pinion type planetary gear device, the rotation direction of the fourth rotating element and the rotation direction of the second and third rotating elements are the same, so that the rotation loss reduces. This structure contributes to making a practical vehicular drive force distribution device.

Furthermore, in the vehicular drive force distribution device, it is also preferable that in the speed shift portion, the fourth rotating element be a sun gear, and the fifth rotating element be a ring gear, and the sixth rotating element be a carrier which rotatably supports pinions that mesh with the ring gear and the sun gear, and which is selectively linked to a non-rotating member via the brake.

According to the vehicular drive force distribution device structured as described above, since an arrangement that allows the structurally easy linking to the first rotating element is provided, the speed shift portion contributes to making a practical vehicular drive force distribution device.

Furthermore, in the vehicular drive force distribution device, it is also preferable that the planetary gear device be a single-pinion type planetary gear device.

According to the vehicular drive force distribution device structured as described above, since the speed shift portion is a single-pinion type planetary gear device, the speed shift portion provides relatively large speed change ratio, thus contributing to making a practical vehicular drive force distribution device.

Furthermore, in the vehicular drive force distribution device, it is also preferable that the planetary gear device be a double-pinion type planetary gear device.

According to the vehicular drive force distribution device structured as described above, since the speed shift portion is a double-pinion type planetary gear device, the rotation direction of the fourth rotating element and the rotation direction of the second and third rotating elements are the same, so that the rotation loss reduces. Thus, the speed shift portion contributes to making a practical vehicular drive force distribution device.

Furthermore, in the vehicular drive force distribution device, it is also preferable that in the speed shift portion, the fourth rotating element be a carrier which rotatably supports pinions that mesh with a ring gear and a sun gear, the fifth rotating element be the sun gear, and the sixth rotating element be the ring gear that is selectively linked to a non-rotating member via the brake.

According to the vehicular drive force distribution device structured as described above, the speed shift portion has a structure that facilitates the disposition of the brake, thus contributing to making a practical vehicular drive force distribution device.

Furthermore, in the vehicular drive force distribution device, it is also preferable that the speed shift portion be a single-pinion type planetary gear device.

According to the vehicular drive force distribution device structured as described above, since the speed shift portion is a single-pinion type planetary gear device, the rotation direction of the fourth rotating element and the rotation direction of the second and third rotating elements is the same, so that the rotation loss reduces. Thus, the speed shift portion contributes to making a practical vehicular drive force distribution device.

Furthermore, in the vehicular drive force distribution device, it is also preferable that the planetary gear device be a double-pinion type planetary gear device.

According to the vehicular drive force distribution device structured as described above, since the speed shift portion is a double-pinion type planetary gear device, the speed shift portion provides relatively large speed change ratio, thus contributing to making a practical vehicular drive force distribution device.

In the vehicular drive force distribution device, it is also preferable that in the speed shift portion, the fourth rotating element be a sun gear, and the fifth rotating element be a carrier that rotatably supports, pinions that mesh with a ring gear and the sun gear, and the six rotating element be a ring gear that is selectively linked to a non-rotating member via the brake.

According to the vehicular drive force distribution device structured as described above, the speed shift portion has a structure that facilitates the disposition of the brake, thus contributing to making a practical vehicular drive force distribution device.

Furthermore, in the vehicular drive force distribution device, it is also preferable that the planetary gear device be a single-pinion type planetary gear device.

According to the vehicular drive force distribution device structured as described above, since the speed shift portion is a single-pinion type planetary gear device, the rotation direction of the fourth rotating element and the rotation direction of the second and third rotating elements are the same, so that the rotation loss reduces. Thus, this speed shift portion contributes to making a practical vehicular drive force distribution device.

Furthermore, in the vehicular drive force distribution device, it is also preferable that the planetary gear device be a double-pinion type planetary gear device.

According to the vehicular drive force distribution device structured as described above, since the speed shift portion is a double-pinion type planetary gear device, the speed shift portion provides relatively large speed change ratio, thus contributing to making a practical vehicular drive force distribution device.

Furthermore, in the vehicular drive force distribution device, it is also preferable that the speed shift portion be constructed of two or more planetary gear devices that include the fourth rotating element, a fifth rotating element linked to the first rotating element, and a sixth rotating element, and that the speed shift portion include a brake capable of braking rotation of the sixth rotating element.

According to the vehicular drive force distribution device structured as described above, since the speed shift portion is constructed of two or more planetary gear devices, a relatively small speed ratio can be provided, thus contributing to making a practical vehicular drive force distribution device.

Furthermore, in the vehicular drive force distribution device, it is also preferable that the two or more planetary gear devices be constructed of a single-pinion type first planetary gear device and a single-pinion type second planetary gear device, and the fourth rotating element be a ring gear of the first planetary gear device, and the fifth rotating element be a ring gear of the second planetary gear device, and the sixth rotating element be a sun gear of the first planetary gear device and a sun gear of the second planetary gear device that are linked to each other, and a carrier of the first planetary gear device and a carrier of the second planetary gear device be linked to each other.

According to the vehicular drive force distribution device structured as described above, since the speed shift portion is constructed of the two planetary gear devices, a relatively small speed shifter can be provided, thus contributing to making a practical vehicular drive force distribution device.

Furthermore, in the vehicular drive force distribution device, it is also preferable that the two or more planetary gear devices be constructed of a single-pinion type first planetary gear device and a single-pinion type second planetary gear device, and the fourth rotating element be a sun gear of the second planetary gear device, and the fifth rotating element be a sun gear of the first planetary gear device, and the sixth rotating element be a carrier of the first planetary gear device and a carrier of the second planetary gear device that are linked to each other, and a ring gear of the first planetary gear device and a ring gear of the second planetary gear device be linked to each other.

According to the vehicular drive force distribution device structured as described above, since the speed shift portion is constructed of the two planetary gear devices, a relatively small speed shifter can be provided, thus contributing to making a practical vehicular drive force distribution device.

Furthermore, in the vehicular drive force distribution device, it is also preferable that the speed shift portion be a speed increase mechanism.

According to the vehicular drive force distribution device structured as described above, since the speed shift portion is a speed increasing mechanism, the transmitted torque is reduced, and therefore the friction engagement elements for transmitting the torque can be reduced in size.

Furthermore, in the vehicular drive force distribution device, it is also preferable that the speed shift portion be a speed reducing mechanism.

According to the vehicular drive force distribution device structured as described above, since the speed shift portion is a speed reducing mechanism, greater torque can be transmitted.

Furthermore, in the vehicular drive force distribution device, it is also preferable that the differential portion be a double-pinion type planetary gear device, and the first rotating element be a ring gear, and the second rotating element be a carrier, and the third rotating element be a sun gear.

According to the vehicular drive force distribution device structured as described above, the differential portion is a double-pinion type planetary gear device, and the first rotating element is the ring gear, and the second rotating element is the carrier, and the third rotating element is the sun gear. Therefore, the rotation direction of the second and third rotating elements is the same as the rotation direction of the first rotating element, thus contributing to making a practical vehicular drive force distribution device.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

In the following description and the accompanying drawings, the present invention will be described in more detail with reference to exemplary embodiments.

Figure 1:
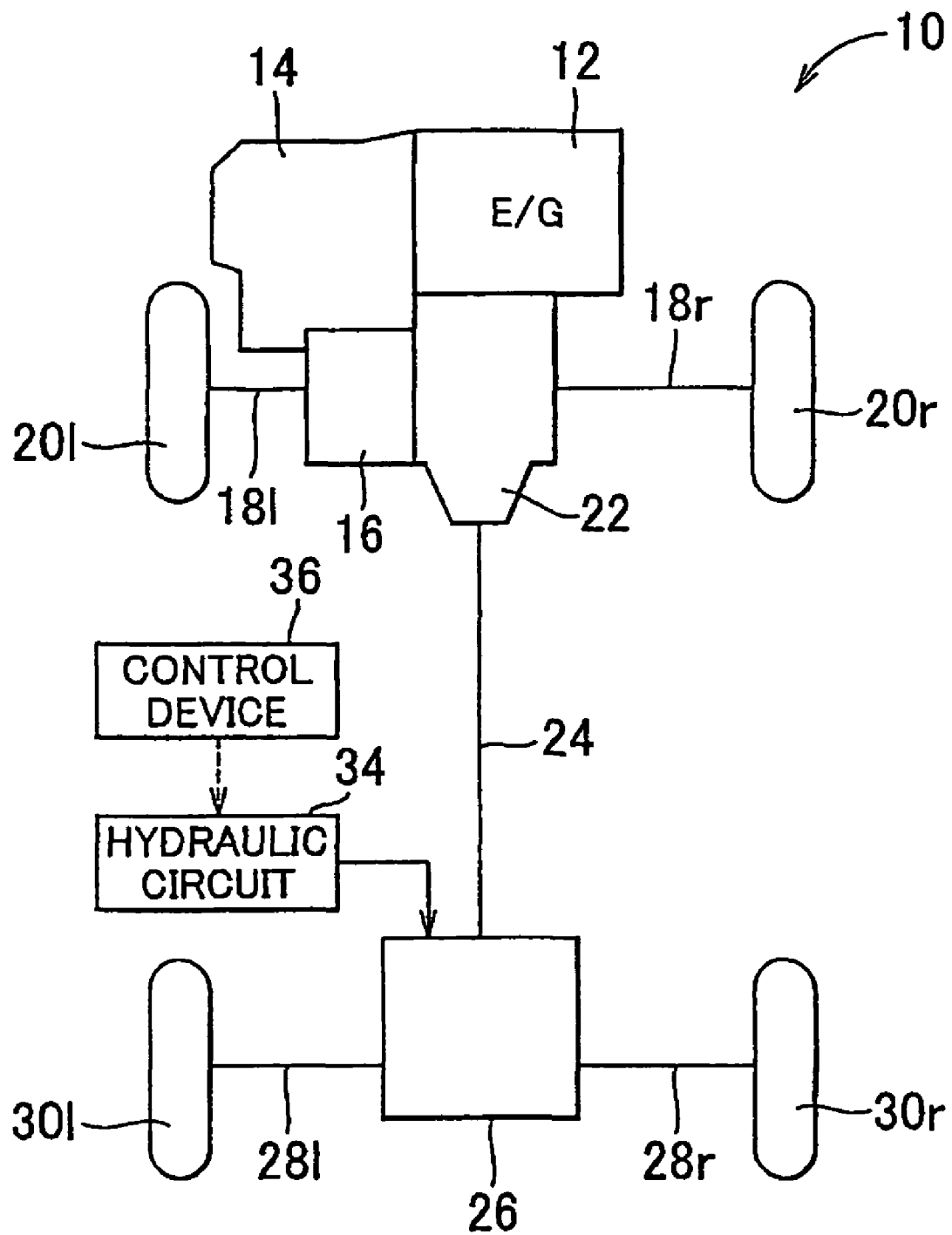
FIG. 1 is a skeleton diagram illustrating a construction of a front-rear-wheel drive vehicle based on a front-mounted engine front wheel drive configuration that has a drive force transmission device to which a vehicular drive force distribution device of an embodiment of the invention is applied.

A first embodiment of the invention will be described. FIG. 1 is a skeleton diagram illustrating a construction of a front-rear-wheel drive vehicle based on a front-mounted engine front wheel drive (FF) configuration which has a drive force transmission device 10 to which a vehicular drive force distribution device of the embodiment of the invention is applied. In FIG. 1, the drive force (torque) generated by an engine 12, that is, a drive force source, is transmitted to a pair of right and left front wheels 20r, 20l (hereinafter, referred to simply as the "front wheels 20" if distinction thereof is not particularly made) via an automatic transmission 14, a front wheel-purpose differential gear device 16, a pair of right and left front wheel axle shafts 18r, 18l (hereinafter, referred to simply as the "front wheel axle shafts 18" if distinction is needed). At the same time, the drive force is also transmitted to a pair of right and left rear wheels 30r, 30l (hereinafter, referred to simply as the "rear wheels 30" if distinction thereof is not particularly made) via a central differential gear device (center differential) 22, a propeller shaft 24 that is a drive force transmission shaft, a vehicular drive force distribution device (hereinafter, referred to simply as the "drive force distribution device") 26 that is the first embodiment of the invention, and a pair of right and left rear wheel axle shafts 28r, 28l (hereinafter, referred to simply as the "rear wheel axle shafts 28" if distinction thereof is not particularly made). As shown in FIG. 1, in the drive force transmission device 10, the rear wheels 30 as driving wheels concerned with the distribution of drive force by the drive force distribution device 26, and the propeller shaft 24 are disposed so that the rotation axis of the rear wheels 30 and the rotation axis of the propeller shaft 24 are orthogonal to each other. Furthermore, the drive force transmission device 10 is provided with a hydraulic circuit 34 that controls the oil pressure supplied into the drive force distribution device 26, and a control device 36 that controls, for example, the oil pressure supplied from the hydraulic circuit 34 into the drive force distribution device 26 via an electromagnetic control valve or the like (not shown) and that is provided in the hydraulic circuit 34. In FIG. 1, the oil pressure output from the hydraulic circuit 34 is shown by a thin-solid line arrow, and the control command output from the control device 36 is shown by a thin-dashed line.

The engine 12 is, for example, an internal combustion engine that generates drive force through combustion of fuel injected into the cylinders, such as a gasoline engine, a diesel engine, etc. The automatic transmission 14 is, for example, a stepped type automatic transmission that increases or reduces the speed of the rotation input from the engine 12 at predetermined speed change ratios $\gamma$, and that selectively establishes one of forward travel speed change steps, reverse travel speed change steps and a neutral position, and performs the speed conversion in accordance with the speed change ratio $\gamma$ of the established step. Incidentally, an input shaft of the automatic transmission 14 is linked to an output shaft of the engine 12 via a torque converter (not shown) or the like.

The control device 36 is a so-called microcomputer that includes a CPU, a ROM, a RAM, an input/output interface, etc., and that executes signal processing in accordance with programs pre-stored in the ROM while utilizing the temporary storage function of the RAM. For example, the control device 36 executes a right-left wheel torque difference control, a differential motion limitation control, etc. (which are described below), by controlling the oil pressure supplied to clutch and brake devices (which are described below) provided in the drive force distribution device 26 through the control of a command value regarding the electric current supplied to an electromagnetic control valve provided in the hydraulic circuit 34. The drive force transmission device 10 is provided with a wheel speed sensor that detects the actual rotation speed of the rear wheels 30 corresponding to the vehicle speed, a shift gear step sensor that detects the speed change step of the automatic transmission 14, a throttle sensor that detects the actual degree of opening of a throttle valve (not shown) provided in the intake and exhaust pipes of the engine 12, an engine rotation speed sensor that detects the actual rotation speed of the engine 12, a longitudinal acceleration sensor, etc. From these sensors, a signal representing the shift gear step, a signal representing the degree of throttle opening, a signal representing the engine rotation speed, a signal representing the longitudinal acceleration, etc., are supplied to the control device 36.

Figure 2:
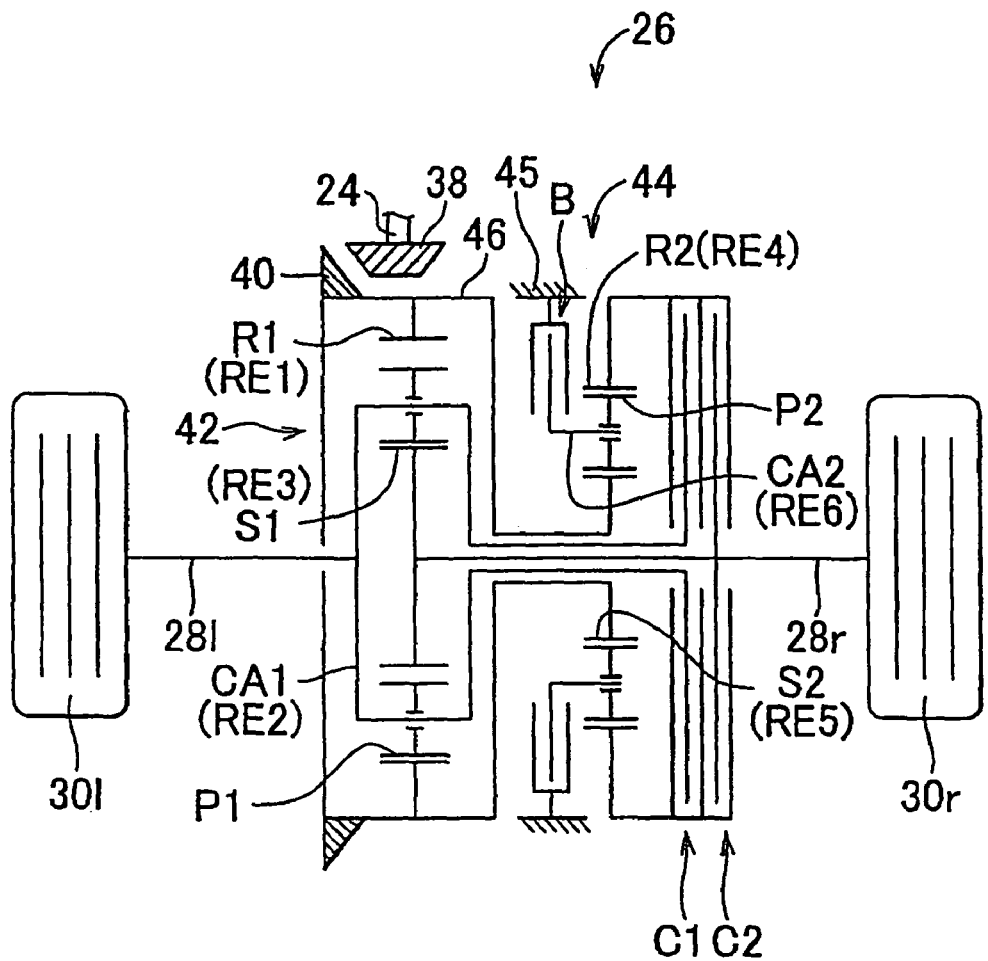
FIG. 2 is a skeleton diagram illustrating a construction of a vehicular drive force distribution device of a first embodiment of the invention.

FIG. 2 is a skeleton diagram illustrating a construction of the drive force distribution device 26. As shown in FIG. 2, drive force is transmitted to the drive force distribution device 26 via a bevel gear 38 connected to an end portion of the propeller shaft 24 that is rotated by the engine 12 via a central differential gear device 22, and a bevel gear 40 meshing with the bevel gear 38. The drive force distribution device 26 includes a differential device 42 for distributing the drive force to the right and left rear wheels 30r, 30l, a speed shift device 44 disposed adjacent to the differential device 42 and coaxially with the rear wheel axle shafts 28r, 28l, and a first clutch C1 and a second clutch C2 that selectively transmit the output of the speed shift device 44 to the differential device 42. Incidentally, the differential device 42 in this embodiment corresponds to a differential portion in the invention, and the speed shift device 44 corresponds to a speed shift portion in the invention.

The differential device 42 is a double-pinion type planetary gear device that includes a ring gear R1 that is a first rotating element, a plurality of pairs of pinions P1 meshing with each other, a carrier CA1 that is a second rotating element RE2 and that supports the pinions P1 so that the pinions P1 are rotatable about their own axes and are also revolvable, and a sun gear S1 that is a third rotating element and that meshes with a ring gear R1 via the plural pairs of pinions P1. The speed change ratio $\gamma$ of the differential device 42 (=the number of teeth of the sun gear S1/the number of teeth of the ring gear R1) is set at, for example, 0.5). The ring gear R1 is provided within a case 46 of the differential device 42 and integrally with the case 46. The rotation of the propeller shaft 24 is transmitted to the ring gear R1 while being reduced in speed, via the bevel gears 38 and 40. The carrier CA1 is connected to the left rear wheel 30l via the left rear wheel axle shaft 28l. The sun gear S1 is linked to the right rear wheel 30r via the right rear wheel axle shaft 28r. Incidentally, the second rotating element RE2 and the third rotating element RE3 are interchangeable, which applies in the description below as well.

The speed shift device 44 is constructed of a single-pinion type planetary gear device that includes a sun gear S2 that is a fifth rotating element RE5, pinions P2, a carrier CA2 that is a sixth rotating element RE6 and that supports the pinions P2 so that the pinions P2 are rotatable about their own axes and are also revolvable, and a ring gear R2 that is a fourth rotating element and that meshes with the sun gear S2 via the pinions P2. The fifth rotating element RE5 is linked to the first rotating element RE1, and functions as an input member of the speed shift device 44. The sixth rotating element RE6 is linked to a torque transfer switching brake B, and is selectively linked to a non-rotating member 45. The fourth rotating element RE4 is caused to function as an output member of the speed shift device 44. The fourth rotating element RE4 is selectively put into slipping engagement with the carrier CA1 of the differential device 42, which is the second rotating element RE2, and the left rear wheel axle shaft 28l, via the first clutch C1, and is selectively put into slipping engagement with the sun gear S1 of the differential device 42, which is the third rotating element RE3, and the right rear wheel axle shaft 28r, via the second clutch C2. Incidentally, the torque transfer switching brake B, the first clutch C1 and the second clutch C2 each are a multi-plate friction engagement device capable of being slippingly engaged. The brake B and the clutches C1, C2 are engaged or released as the hydraulic circuit 34 is switched by the control device 36. The transmitted torque at the time of slipping engagement is controlled through the hydraulic control performed in accordance with need. Incidentally, the torque transfer switching brake B in the embodiment corresponds to a brake in the invention.

The distribution of the drive force to the right and left rear wheels 30r, 30l by the drive force distribution device 26 constructed as described above will be described. The drive force generated by the engine 12 is input to the differential device 42 as a drive force that rotates the case 46 of the differential device 42, via the automatic transmission 14, the central differential gear device 22, the propeller shaft 24, etc. Since the ring gear R1 of the differential device 42 is provided integrally with the case 46, the drive force from the propeller shaft 24 is input to the differential device 42 via the ring gear R1. FIGS. 3 to 6 are each an alignment chart of the differential device 42 of the drive force distribution device 26. In the charts, the left-side vertical axis shows the rotation speed Nl of the carrier CA1, that is, the second rotating element RE2 linked to the left rear wheel 30l, and the right-side vertical axis shows the rotation speed Nr of the third rotating element RE3 linked to the right rear wheel 30r, and the central vertical axis shows the rotation speed Ni of the ring gear R1, that is, the first rotating element RE1 that is rotated integrally with the case 46, and the rotation speed Nc of the fourth rotating element RE4. The tables shown to the right of each chart show the states of the torque transfer switching brake B, the first clutch C1 and the second clutch C2. In the tables, a symbol "O" shows the engaged state, and a symbol "X" shows the released state. The straight line between the rotation speed Nl and the rotation speed Nc shows the state of the first clutch C1; specifically, the solid line shows the slip-engaged state, and a dashed line shows the released state. The straight line between the rotation speed Nc and the rotation speed Nr shows the state of the second clutch C2; specifically, the dashed line shows the slip-engaged state, and the dashed line shows the released state.

Figure 3:
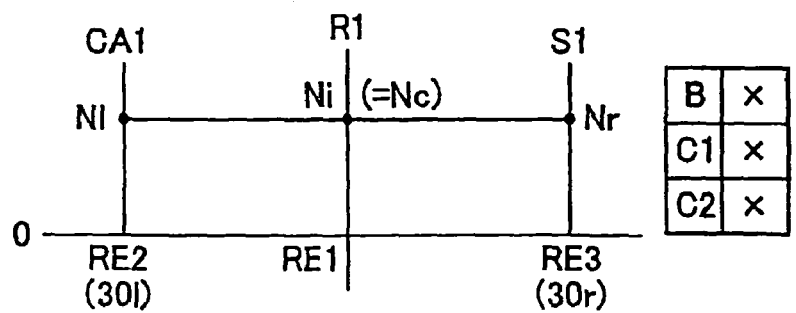
FIG. 3 is an alignment chart of a differential device when the vehicular drive force distribution device shown in FIG. 2 is not controlled.

FIG. 3 is an alignment chart of the drive force distribution device 26 at the time of a non-controlled state. During the non-controlled state, the torque transfer switching brake B, the first clutch C1 and the second clutch C2 each are in the released state. During this state, only the differential device 42 functions and the speed shift device 44 is in a free rotation state, so that the drive force is distributed equally to the right and left rear wheels 30r, 30l. Thus, the drive force distribution device 26 functions as an ordinary open differential without performing torque transfer nor differential motion limitation. During the linear traveling, the differential device 42 is rotated integrally as a unit, and the rotation speed Nl, Nr of the right and left rear wheels 30r, 30l are substantially equal.

Figure 4:
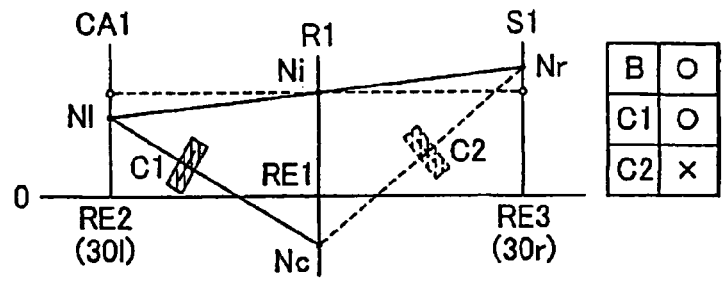
FIG. 4 is an alignment chart of the differential device at the time of a right-left wheel torque control of the vehicular drive force distribution device shown in FIG. 2.

FIG. 4 is an example of an alignment chart at the time of a right-left wheel torque difference control, for example, at the time of a state in which during a left-hand turn of the vehicle or the like, the drive force on the right rear wheel 30r is increased so as to restrain the understeer. In FIG. 4, the torque transfer switching brake B is engaged, and the first clutch C1 is slip-engaged, and the second clutch C2 is released. When the torque transfer switching brake B is engaged, the carrier CA2 of the speed shift device 44 is locked, so that the rotation speed Nc of the fourth rotating element RE4 is reduced in the reverse rotation direction and is thus output. Furthermore, since the first clutch C1 is slip-engaged, the output of the fourth rotating element RE4 is transmitted to the second rotating element RE2. Since the rotation speed Nc of the fourth rotating element RE4 is reduced in the reverse rotation direction, the foregoing slip engagement reduces the drive force of the left rear wheel 30l, and relatively increases the drive force of the right rear wheel 30r. Furthermore, since the rotation speed Nl of the left rear wheel 30l is reduced due to the slip engagement, the differential device 42 increases the speed of the right rear wheel 30r.

Figure 5:
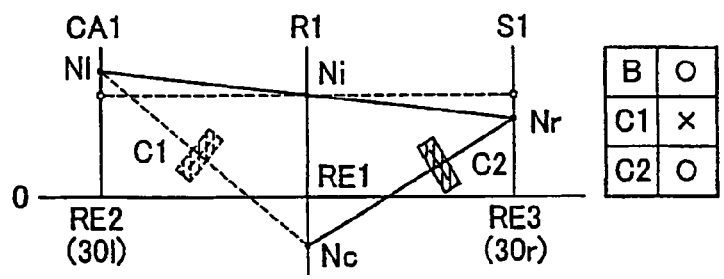
FIG. 5 is another alignment chart of the differential device at the time of the right-left wheel torque control of the vehicular drive force distribution device shown in FIG. 2.

During a right-hand turn of the vehicle or the like, the understeer can be restrained by increasing the drive force of the left rear wheel 30l as shown in FIG. 5. In this case, the torque transfer switching brake B is engaged, and the second clutch C2 is slip-engaged, and the first clutch C1 is released. As in FIG. 4, when the torque transfer switching brake B is engaged, the carrier CA2 of the speed shift device 44 is locked, so that the rotation speed Nc of the fourth rotating element RE4 is reduced in the reverse direction, and is thus output. Since the second clutch C2 is slip-engaged, the output of the fourth rotating element RE4 is transmitted to the third rotating element RE3. As the rotation speed of the fourth rotating element RE4 is reduced in the reverse rotation direction by the slipping engagement, the slipping engagement reduces the drive force of the right rear wheel 30r, and relatively increases the drive force of the left rear wheel 30l. Furthermore, as the rotation speed Nr of the right rear wheel 30r is reduced by the slipping engagement, the rotation speed of the left rear wheel 30l is increased by the differential device 42.

Figure 6:
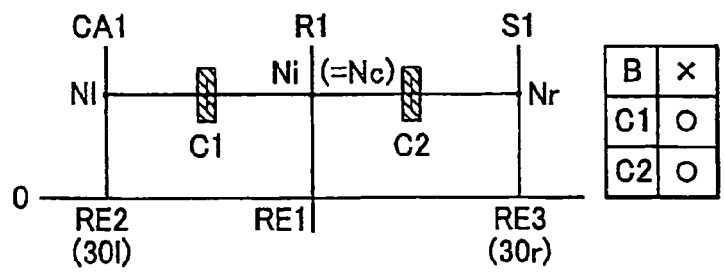
FIG. 6 is an alignment chart of the differential device at the time of a differential motion limitation control of the vehicular drive force distribution device shown in FIG. 2.

FIG. 6 is an alignment chart at the time of the differential motion limitation control. At the time of the differential motion limitation control, the torque transfer switching brake B is released and the first clutch C1 and the second clutch C2 are engaged. Due to the engagement of both the first clutch C1 and the second clutch C2, the differential motion limitation is performed. When both the clutches C1, C2 are completely engaged, the drive force distribution device 26 functions as a non-slip differential device, and the right and left rear wheels 30r, 30l rotate equally. Incidentally, the differential motion limiting force can be arbitrarily set in proportion to the clutch control torque.

According to the drive force distribution device 26 of the foregoing embodiment, the speed of the rotation of the first rotating element RE1 driven by the drive force transmitted from the drive source can be shifted by the speed shift device 44 so that rotation is transmitted, via the first clutch C1 or the second clutch C2, to the second rotating element RE2 or the third rotating element RE3 of the differential device 42. In this fashion, the right and left torques of the right and left driving wheels 30r, 30l can be controlled, and therefore the yaw moment control in arbitrary direction can be accomplished. Furthermore, in conjunction with the limitation of the differential motion, the transmitted torque amount that is transmitted to the fourth rotating element RE4 can be eliminated by allowing the speed shift device 44 to freely rotate, and the accumulated amount of sliding of the friction engagement elements at the time of differential motion limitation can be reduced by completely engaging the first clutch C1 and the second clutch C2 without allowing any slipping thereof. Thus, the differential motion limitation control can be realized without increasing the size of the first clutch C1 and the second clutch C2.

Furthermore, according to the foregoing embodiment, since the speed shift device 44 includes the torque transfer switching brake B that is capable of braking the rotation of the sixth rotating element RE6, the speed shift device 44 assumes a speed shifted state by establishing the engagement or half-engagement of the torque transfer switching brake B, so that the drive force is distributed.

Furthermore, according to the foregoing embodiment, since the speed shift device 44 is structured so that the first clutch C1 and the second clutch C2 are easily disposed, the speed shift device 44 contributes to making a practical drive force distribution device 26.

Furthermore, according to the foregoing embodiment, since the speed shift device 44 is a single-pinion type planetary gear device, the speed shift device 44 provides relatively large speed change ratio, thus contributing to malting a practical drive force distribution device 26.

Furthermore, according to the foregoing embodiment, since the speed shift device 44 is a speed reducing mechanism, the speed shift device 44 is able to transmit increased torque.

Next, other embodiments of the invention will be described. In the description below, portions comparable to those of the foregoing embodiment are affixed with the same reference characters, and the description thereof will be omitted.

Figure 7:
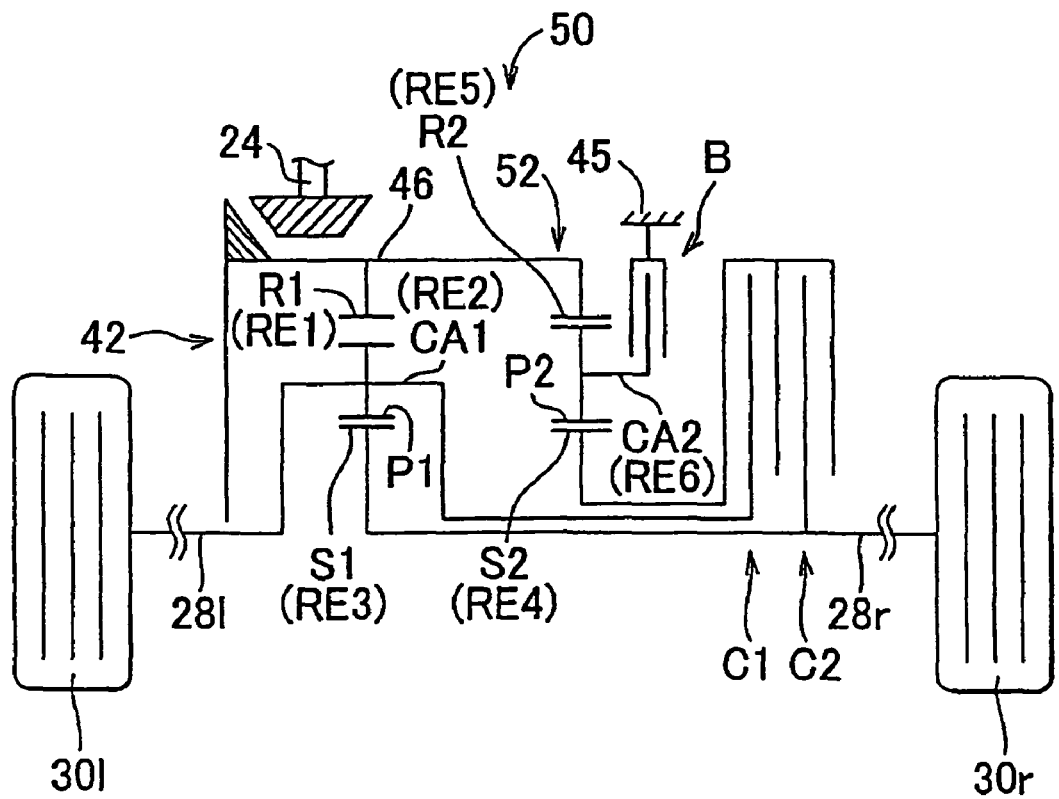
FIG. 7 is a skeleton diagram illustrating a construction of a vehicular drive force distribution device of a second embodiment of the invention.

A second embodiment of the invention will be described. FIG. 7 is a skeleton diagram of a drive force distribution device 50 of the second embodiment of the invention. In the second embodiment shown in FIG. 7, a lower half illustration is omitted since the drive force distribution device 50 has a symmetrical construction.

The drive force distribution device 50 of FIG. 7 is different from the drive force distribution device 26 of FIG. 2 merely in the construction of a speed shift device 52. Other constructions of the drive force distribution device 50 are substantially the same as those of the drive force distribution device 26, and the description thereof will be omitted The speed shift device 52 in the second embodiment corresponds to a speed shift portion in the invention.

The speed shift device 52 is constructed of a single-pinion type planetary gear device that includes a sun gear S2 that is a fourth rotating element RE4, pinions P2, a carrier CA2 that is a sixth rotating element RE6 and that supports the pinions P2 so that the pinions P2 are rotatable about their own axes and are also revolvable, and a ring gear R2 that is a fifth rotating element RE5 and that meshes with the sun gear S2 via the pinions P2. The fifth rotating element RE5 is linked to the first rotating element RE1, and functions as an input member of the speed shift device 52. The sixth rotating element RE6 is linked to a torque transfer switching brake B, and is linked selectively to a non-rotating member 45. The fourth rotating element RE4 is selectively put into slipping engagement with a carrier CA1 of the differential device 42 which is a second rotating element RE2, and the left rear wheel axle shaft 28*l*, via the first clutch C1, and is selectively put into slipping engagement with a sun gear S1 of the differential device 42 which is a third rotating element RE3, and the right rear wheel axle shaft 28*r*, via the second clutch C2.

The distribution of the drive force to the right and left rear wheels 30*r*, 30*l* by the drive force distribution device 50 constructed as described above will be described. The drive force generated by the engine 12 is input to the differential device 42 as a drive force that rotates the case 46, via the automatic transmission 14, the central differential gear device 22, the propeller shaft 24, etc. Since the ring gear R1 of the differential device 42 is provided integrally with the case 46, the drive force from the propeller shaft 24 is input to the differential device 42 via the ring gear R1.

Figure 8:
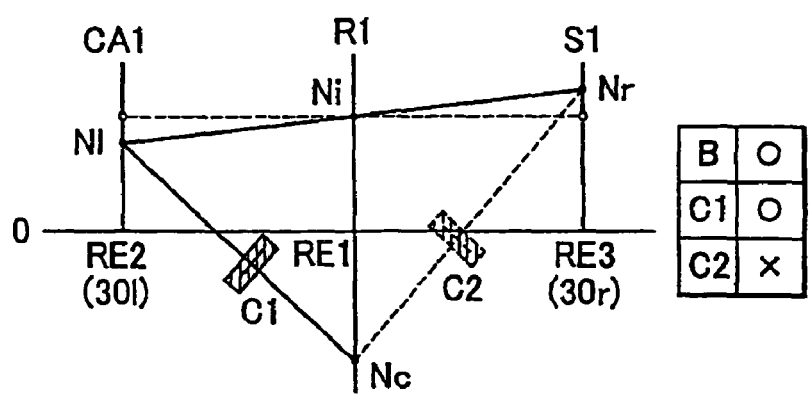
FIG. 8 is an alignment chart of the differential device at the time of the right-left wheel torque control of the vehicular drive force distribution device shown in FIG. 7.

FIG. 8 is an example of an alignment chart at the time of a right-left wheel torque difference control of the drive force distribution device 50, for example, an alignment chart in the case where during a left-hand turn of the vehicle or the like, the drive force on the right rear wheel 30*r* is increased so as to restrain the understeer. In FIG. 8, the torque transfer switching brake B is engaged, and the first clutch C1 is slip-engaged, and the second clutch C2 is released. When the torque transfer switching brake B is engaged, the carrier CA2 of the speed shift device 52 is locked, so that the rotation speed Nc of the fourth rotating element RE4 is increased in the reverse rotation direction and is thus output. Furthermore, since the first clutch C1 is slip-engaged, the output of the fourth rotating element RE4 is transmitted to the second rotating element RE2. Since the rotation speed Nc of the fourth rotating element RE4 is increased in the reverse rotation direction, the foregoing slip engagement reduces the drive force of the left rear wheel 30*l*, and relatively increases the drive force of the right rear wheel 30*r*. Furthermore, since the rotation speed Nl of the left rear wheel 30*l* is reduced due to the slip engagement, the differential device 42 increases the speed of the right rear wheel 30*r*.

Figure 9:
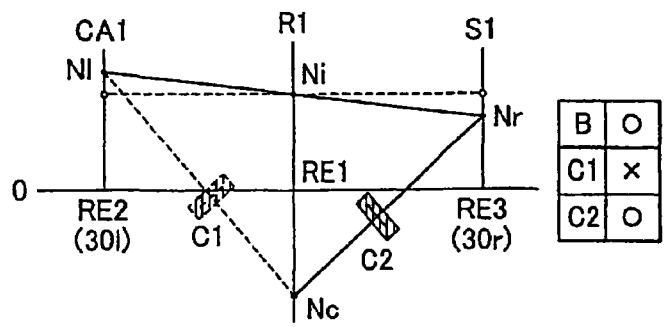
FIG. 9 is another alignment chart of the differential device at the time of the right-left wheel torque control of the vehicular drive force distribution device shown in FIG. 7.

During a right-hand turn of the vehicle or the like, the understeer can be restrained by increasing the drive force of the left rear wheel 30*l* as shown in FIG. 9. In this case, the torque transfer switching brake B is engaged, and the second clutch C2 is slip-engaged, and the first clutch C1 is released. As in FIG. 8, when the torque transfer switching brake B is engaged, the carrier CA2 of the speed shift device 52 is locked, so that the rotation speed Nc of the fourth rotating element RE4 is increased in the reverse direction, and is thus output. Since the second clutch C2 is slip-engaged, the output of the fourth rotating element RE4 is transmitted to the third rotating element RE3. As the rotation speed of the fourth rotating element RE4 is increased in the reverse rotation direction by the slipping engagement, the slipping engagement reduces the drive force of the right rear wheel 30*r*, and relatively increases the drive force of the left rear wheel 30L Furthermore, as the rotation speed Nr of the right rear wheel 30*r* is reduced by the slipping engagement, the rotation speed of the left rear wheel 30*l* is increased by the differential device 42.

During the non-controlled state of the drive force distribution device 50, the torque transfer switching brake B, the first clutch C1 and the second clutch C2 each are in the released state, as in the case of FIG. 3. During this state, only the differential device 42 functions and the speed shift device 44 is in a free rotation state, so that the drive force is distributed equally to the right and left rear wheels 30*r*, 30*l*. Thus, the drive force distribution device 26 functions as an ordinary open differential without performing a right-left wheel torque difference control nor a differential motion limitation control.

At the time of the differential motion limitation, the torque transfer switching brake B is released and the first clutch C1 and the second clutch C2 are engaged, as in FIG. 6. Due to the engagement of both the first clutch C1 and the second clutch C2, the differential motion limitation is performed. When both the clutches C1, C2 are completely engaged, the drive force distribution device 50 functions as a non-slip differential device, and the right and left rear wheels 30*r*, 30*l* rotate equally. Incidentally, the differential motion limiting force can be arbitrarily set in proportion to the clutch control torque.

Thus, according to the second embodiment, the drive force distribution device 50 is able to perform the right-left wheel torque difference control, and is able to perform the differential motion limitation control without a need to increase the size of the first clutch C1 and the second clutch C2, as in the foregoing embodiment.

According to the second embodiment, since the speed shift device 52 has an arrangement that allows the structurally easy linking to the first rotating element RE1, the speed shift device 52 contributes to making a practical drive force distribution device 50.

Furthermore, according to the second embodiment, since the speed shift device 52 is a single-pinion type planetary gear device, the speed shift device 52 provides relatively large speed change ratio, thus contributing to making a practical drive force distribution device 50.

Furthermore, according to the second embodiment, since the speed shift device 52 is a speed increasing mechanism, the transmitted torque is reduced, and therefore the friction engagement elements for transmitting the torque can be reduced in size.

Figure 10:
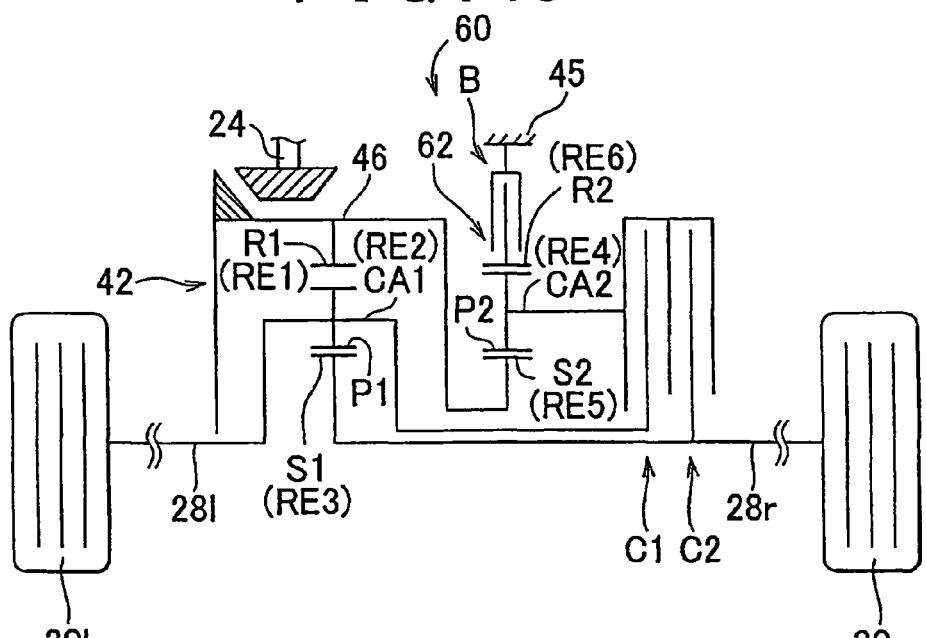
FIG. 10 is a skeleton diagram illustrating a construction of a vehicular drive force distribution device of a third embodiment of the invention.

Next, a third embodiment of the invention will be described. FIG. 10 is a skeleton diagram of a drive force distribution device 60 of the third embodiment of the invention. In the third embodiment shown in FIG. 10, a lower half illustration is omitted since the drive force distribution device 60 has a symmetrical construction.

The drive force distribution device 60 of FIG. 10 is different from the drive force distribution device 26 of FIG. 2 merely in the construction of a speed shift device 62. Other constructions of the drive force distribution device 60 are substantially the same as those of the drive force distribution device 26, and the description thereof will be omitted. The speed shift device 62 in the third embodiment corresponds to the speed shift portion in the invention.

The speed shift device 62 is constructed of a single-pinion type planetary gear device that includes a sun gear S2 that is a fifth rotating element RE5, pinions P2, a carrier CA2 that is a fourth rotating element RE4 and that supports the pinions P2 so that the pinions P2 are rotatable about their own axes and are also revolvable, and a ring gear R2 that is a sixth rotating element RE6 and that meshes with the sun gear S2 via the pinions P2. The fifth rotating element RE5 is linked to the first rotating element RE1, and functions as an input member of the speed shift device 62. The sixth rotating element RE6 is linked to a torque transfer switching brake B, and is linked selectively to a non-rotating member 45. The fourth rotating element RE4 is selectively put into slipping engagement with a carrier CA1 of the differential device 42 which is a second rotating element RE2, and the left rear wheel axle shaft 28*l*, via the first clutch C1, and is selectively put into slipping engagement with a sun gear S1 of the differential device 42 which is a third rotating element RE3, and the right rear wheel axle shaft 28*r*, via the second clutch C2.

The distribution of the drive force to the right and left rear wheels 30*r*, 30*l* by the drive force distribution device 60 constructed as described above will be described. The drive force generated by the engine 12 is input to the differential device 42 as a drive force that rotates the case 46 of the differential device 42, via the automatic transmission 14, the central differential gear device 22, the propeller shaft 24, etc. Since the ring gear R1 of the differential device 42 is provided integrally with the case 46, the drive force from the propeller shaft 24 is input to the differential device 42 via the ring gear R1.

Figure 11:
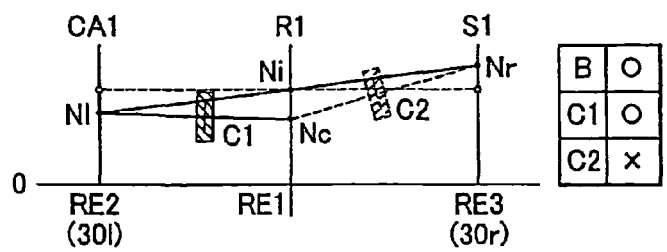
FIG. 11 is an alignment chart of the differential device at the time of the right-left wheel torque control of the vehicular drive force distribution device shown in FIG. 10.

FIG. 11 is an example of an alignment chart at the time of a right-left wheel torque difference control of the drive force distribution device 60, for example, an alignment chart in the case where during a left-hand turn of the vehicle or the like, the drive force on the right rear wheel 30*r* is increased so as to restrain the understeer. In FIG. 11, the torque transfer switching brake B is engaged, and the first clutch C1 is slip-engaged, and the second clutch C2 is released. When the torque transfer switching brake B is engaged, the ring gear R2 of the speed shift device 62 is locked, so that the rotation speed Nc of the fourth rotating element RE4 is reduced in the same rotation direction and is thus output. Furthermore, since the first clutch C1 is slip-engaged, the output of the fourth rotating element RE4 is transmitted to the second rotating element RE2. Since the rotation speed Nc of the fourth rotating element RE4 is reduced in the same rotation direction, the foregoing slip engagement reduces the drive force of the left rear wheel 30*l*, and relatively increases the drive force of the right rear wheel 30*r*. Furthermore, since the rotation speed Nl of the left rear wheel 30*l* is reduced due to the slip engagement, the differential device 42 increases the speed of the right rear wheel 30*r*.

Figure 12:
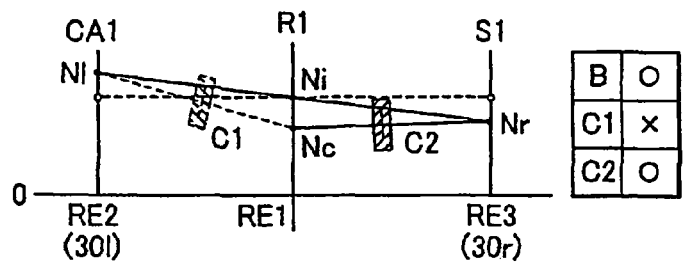
FIG. 12 is another alignment chart of the differential device at the time of the right-left wheel torque control of the vehicular drive force distribution device shown in FIG. 10.

During a right-hand turn of the vehicle or the like, the understeer can be restrained by increasing the drive force of the left rear wheel 30*l* as shown in FIG. 12. In this case, the torque transfer switching brake B is engaged, and the second clutch C2 is slip-engaged, and the first clutch C1 is released. As in FIG. 11, when the torque transfer switching brake B is engaged, the ring gear R2 of the speed shift device 62 is locked, so that the rotation speed Nc of the fourth rotating element RE4 is reduced in the same rotation direction, and is thus output. Since the second clutch C2 is slip-engaged, the output of the fourth rotating element RE4 is transmitted to the third rotating element RE3. As the rotation speed of the fourth rotating element RE4 is reduced in the same rotation direction by the slipping engagement, the slipping engagement reduces the drive force of the right rear wheel 30*r*, and relatively increases the drive force of the left rear wheel 30*l*. Furthermore, as the rotation speed Nr of the right rear wheel 30*r* is reduced by the slipping engagement the rotation speed of the left rear wheel 30*l* is increased by the differential device 42.

During the non-controlled state of the drive force distribution device 60, the torque transfer switching brake B, the first clutch C1 and the second clutch C2 each are in the released state, as in the case of FIG. 3. During this state, only the differential device 42 functions and the speed shift device 62 is in a free rotation state, so that the drive force is distributed equally to the right and left rear wheels 30*r*, 30*l*. Thus, the drive force distribution device 60 functions as an ordinary open differential without performing a right-left wheel torque difference control nor a differential motion limitation control.

At the time of the differential motion limitation, the torque transfer switching brake B is released and the first clutch C1 and the second clutch C2 are engaged, as in FIG. 6. Due to the engagement of both the first clutch C1 and the second clutch C2, the differential motion limitation is performed. When both the clutches C1, CZ are completely engaged, the drive force distribution device 60 functions as a non-slip differential device, and the right and left rear wheels 30*r*, 30*l* rotate equally. Incidentally, the differential motion limiting force can be arbitrarily set in proportion to the clutch control torque.

Thus, according to the third embodiment, the drive force distribution device 60 is able to perform the right-left wheel torque difference control, and is able to perform the differential motion limitation control without a need to increase the size of the first clutch C1 and the second clutch C2, as in the foregoing embodiments.

According to the third embodiment, the speed shift device 62 structurally facilitates the disposition of the torque transfer switching brake B, thus contributing to making a practical drive force distribution device 60.

Furthermore, according to the third embodiment, since the speed shift device 62 is a single-pinion type planetary gear device, the fourth rotating element RE4 and the second and third rotating elements RE2, RE3 rotate in the same rotation direction, so that the rotation loss reduces. Thus, the speed shift device 62 contributes to making a practical vehicular drive force distribution device.

Furthermore, according to the third embodiment, since the speed shift device 62 is a speed reducing mechanism, the speed shift device 62 is able to transmit increase torque.

Figure 13:
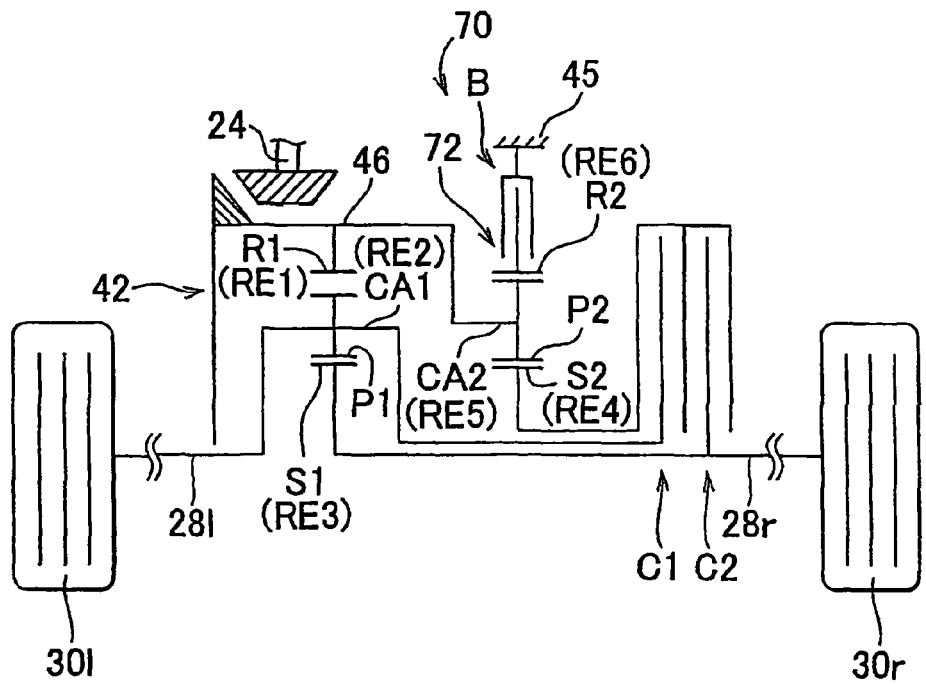
FIG. 13 is a skeleton diagram illustrating a construction of a vehicular drive force distribution device of a fourth embodiment of the invention.

Next, a fourth embodiment of the invention will be described FIG. 13 is a skeleton diagram of a drive force distribution device 70 of the fourth embodiment of the invention. In the fourth embodiment shown in FIG. 13, a lower half illustration is omitted since the drive force distribution device 70 has a symmetrical construction.

The drive force distribution device 70 of FIG. 13 is different from the drive force distribution device 26 of FIG. 2 merely in the construction of a speed shift device 72. Other constructions of the drive force distribution device 70 are substantially the same as those of the drive force distribution device 26, and the description thereof will be omitted. The speed shift device 72 in the fourth embodiment corresponds to the speed shift portion in the invention.

The speed shift device 72 is constructed of a single-pinion type planetary gear device that includes a sun gear S2 that is a fourth rotating element RE4, pinions P2, a carrier CA2 that is a fifth rotating element RE5 and that supports the pinions P2 so that the pinions P2 are rotatable about their own axes and are also revolvable, and a ring gear R2 that is a sixth rotating element RE6 and that meshes with the sun gear S2 via the pinions P2. The fifth rotating element RE5 is linked to the first rotating element RE1, and functions as an input member of the speed shift device 72. The sixth rotating element RE6 is linked to a torque transfer switching brake B, and is linked selectively to a non-rotating member 45. The fourth rotating element RE4 is selectively put into slipping engagement with a carrier CA1 of the differential device 42 which is a second rotating element RE2, and the left rear wheel axle shaft 28L via the first clutch C1, and is selectively put into slipping engagement with a sun gear S1 of the differential device 42 which is a third rotating element RE3, and the right rear wheel axle shaft 28r, via the second clutch C2.

The distribution of the drive force to the right and left rear wheels 30r, 30l by the drive force distribution device 70 constructed as described above will be described. The drive force generated by the engine 12 is input to the differential device 42 as a drive force that rotates the case 46 of the differential device 42, via the automatic transmission 14, the central differential gear device 22, the propeller shaft 24, etc. Since the ring gear R1 of the differential device 42 is provided integrally with the case 46, the drive force from the propeller shaft 24 is input to the differential device 42 via the ring gear R1.

Figure 14:
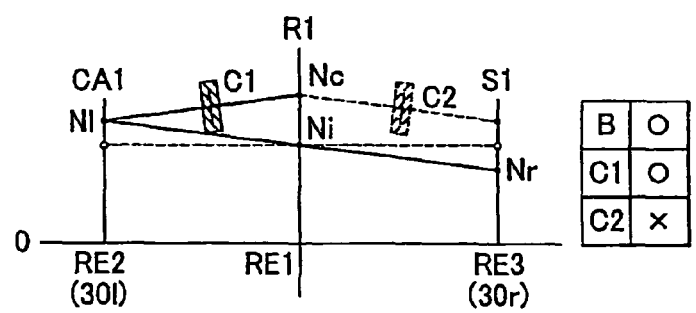
FIG. 14 is an alignment chart of the differential device at the time of the right-left wheel torque control of the vehicular drive force distribution device shown in FIG. 13.

FIG. 14 is an example of an alignment chart at the time of the right-left wheel torque difference control of the drive force distribution device 70, for example, an alignment chart in the case where during a right-hand turn of the vehicle or the like, the drive force on the left rear wheel 30l is increased so as to restrain the understeer. In FIG. 14, the torque transfer switching brake B is engaged, and the first clutch C1 is slip-engaged, and the second clutch C2 is released. When the torque transfer switching brake B is engaged, the ring gear R2 of the speed shift device 72 is locked, so that the rotation speed Nc of the fourth rotating element RE4 is increased in the same rotation direction and is thus output. Furthermore, since the first clutch C1 is slip-engaged, the output of the fourth rotating element RE4 is transmitted to the second rotating element RE2. Since the rotation speed Nc of the fourth rotating element RE4 is increased in the same rotation direction, the foregoing slip engagement increases the drive force of the left rear wheel 30l, and relatively reduces the drive force of the right rear wheel 30r. Furthermore, since the rotation speed Nl of the left rear wheel 30l is increased due to the slip engagement, the differential device 42 reduces the speed of the right rear wheel 30r.

Figure 15:
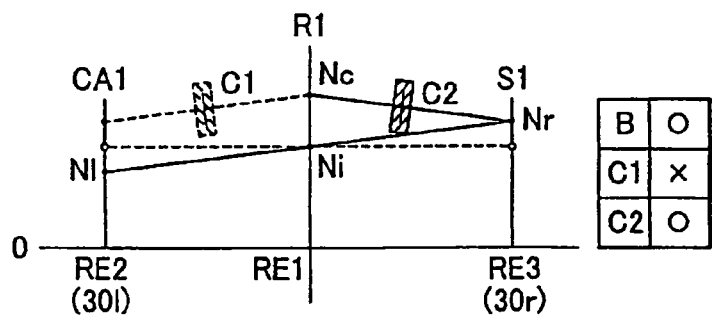
FIG. 15 is another alignment chart of the differential device at the time of the right-left wheel torque control of the vehicular drive force distribution device shown in FIG. 13.

During a left-hand turn of the vehicle or the like, the understeer can be restrained by increasing the drive force of the right rear wheel 30r as shown in FIG. 15. In this case, the torque transfer switching brake B is engaged, and the second clutch C2 is slip-engaged, and the first clutch C1 is released.

As in FIG. 14, when the torque transfer switching brake B is engaged, the ring gear R2 of the speed shift device 72 is locked, so that the rotation speed Nc of the fourth rotating element RE4 is increased in the same rotation-direction, and is thus output Since the second clutch C2 is slip-engaged, the output of the fourth rotating element RE4 is transmitted to the third rotating element RE3. As the rotation speed of the fourth rotating element RE4 is reduced in the same rotation direction by the slipping engagement, the slipping engagement increases the drive force of the right rear wheel 30r, and relatively reduces the drive force of the left rear wheel 30l. Furthermore, as the rotation speed Nr of the right rear wheel 30r is increased by the slipping engagement, the rotation speed of the left rear wheel 30l is reduced by the differential device 42.

During the noncontrolled state of the drive force distribution device 70, the torque transfer switching brake B, the first clutch C1 and the second clutch C2 each are in the released state, as in the case of FIG. 3. During this state, only the differential device 42 functions and the speed shift device 72 is in a free rotation state, so that the drive force is distributed equally to the right and left rear wheels 30r, 30l. Thus, the drive force distribution device 70 functions as an ordinary open differential without performing a torque transfer nor a differential motion limitation.

At the time of the differential motion limitation, the torque transfer switching brake B is released and the first clutch C1 and the second clutch C2 are engaged, as in FIG. 6. Due to the engagement of both the first clutch C1 and the second clutch C2, the differential motion limitation is performed. When both the clutches C1, C2 are completely engaged, the drive force distribution device 60 functions as a non-slip differential device, and the right and left rear wheels 30r, 30l rotate equally. Incidentally, the differential motion limiting force can be arbitrarily set in proportion to the clutch control torque.

Thus, according to the fourth embodiment, the drive force distribution device 70 is able to perform the right-left wheel torque difference control, and is able to perform the differential motion limitation control without a need to increase the size of the first clutch C1 and the second clutch C2, as in the foregoing embodiments.

According to the fourth embodiment, since the speed shift device 72 structurally facilitates the disposition of the torque transfer switching brake B, the speed shift device 72 contributes to making a practical drive force distribution device 70.

Furthermore, according to the fourth embodiment, since the speed shift device 72 is a single-pinion type planetary gear device, the fourth rotating element RE4 and the second and third rotating elements RE2, RE3 rotate in the same rotation direction, so that the rotation loss reduces. Thus, the speed shift device 72 contributes to making a practical vehicular drive force distribution device.

Furthermore, according to the fourth embodiment, since the speed shift device 72 is a speed increasing mechanism, the transmitted torque is reduced, and therefore the friction engagement elements for transmitting the torque can be reduced in size.

Figure 16:
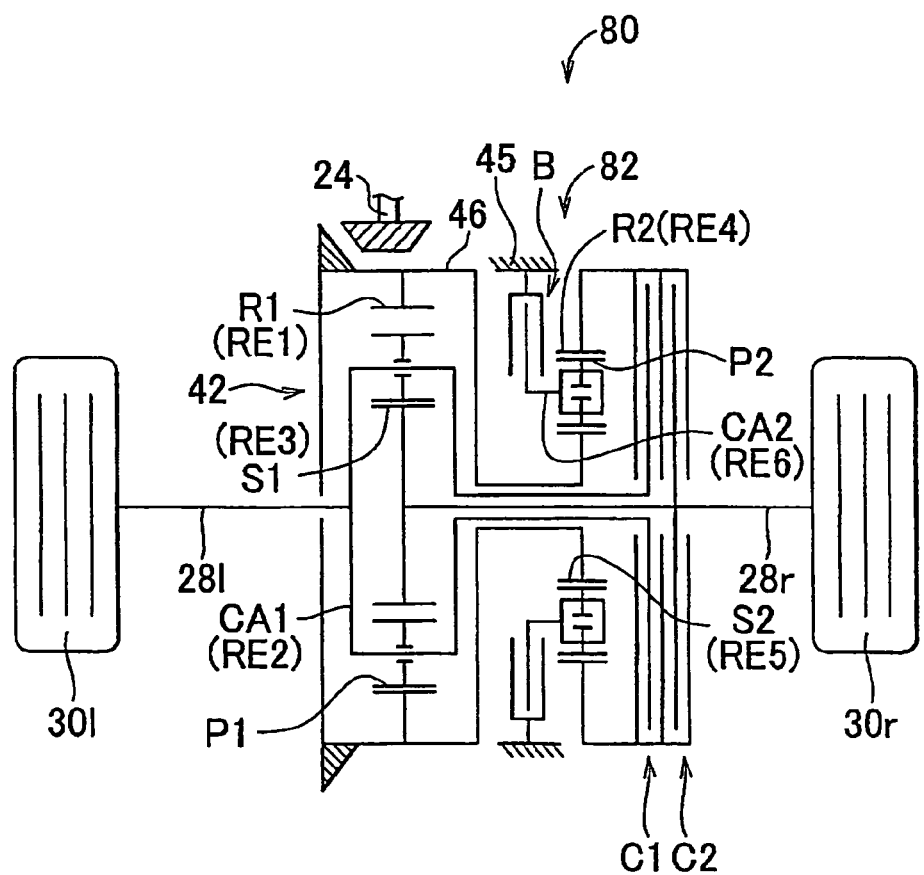
FIG. 16 is a skeleton diagram illustrating a construction of a vehicular drive force distribution device of a fifth embodiment of the invention.

Next, a fifth embodiment of the invention will be described. FIG. 16 is a skeleton diagram of a drive force distribution device 80 of the fifth embodiment of the invention. The drive force distribution device 80 of FIG. 16 is different from the drive force distribution device 26 of FIG. 2 merely in the construction of a speed shift device 82. Other constructions of the drive force distribution device 80 are substantially the same as those of the drive force distribution device 26, and the description thereof will be omitted. The speed shift device 82 in the fifth embodiment corresponds to the speed shift portion in the invention.

The speed shift device 82 is constructed of a double-pinion type planetary gear device that includes a sun gear S1 that is a fifth rotating element RE5, a plurality of pairs of pinions P2 that mesh with each other, a carrier CA2 that is a sixth rotating element RE6 and that supports the pinions P2 so that the pinions P2 are rotatable about their own axes and are also revolvable, and a ring gear R2 that is a fourth rotating element RE4 and that meshes with the sun gear S2 via the pinions P2. The fifth rotating element RE5 is linked to the first rotating element RE1, and functions as an input member of the speed shift device 82. The sixth rotating element RE6 is linked to a torque transfer switching brake B, and is linked selectively to a non-rotating member 45. The fourth rotating element RE4 is selectively put into slipping engagement with a carrier CA1 of the differential device 42 which is a second rotating element RE2, and the left rear wheel axle shaft 28*l*, via the first clutch C1, and is selectively put into slipping engagement with a sun gear S1 of the differential device 42 which is a third rotating element RE3, and the right rear wheel axle shaft 28*r*, via the second clutch C2.

The distribution of the drive force to the right and left rear wheels 30*r*, 30*l* by the drive force distribution device 80 constructed as described above will be described The drive force generated by the engine 12 is input to the differential device 42 as a drive force that rotates the case 46 of the differential device 42, via the automatic transmission 14, the central differential gear device 22, the propeller shaft 24, etc. Since the ring gear R1 of the differential device 42 is provided integrally with the case 46, the drive force from the propeller shaft 24 is input to the differential device 42 via the ring gear R1. When the torque transfer switching brake B is engaged and the carrier CA2 is locked, the rotation speed of the fourth rotating element RE4 of the speed shift device 82 is reduced in the same rotation direction as the rotation direction of the first rotating element RE1, and is thus output. Therefore, the alignment chart at the time of the right-left wheel torque difference control is substantially the same as the alignment charts of FIGS. 11 and 12, and the drive force is appropriately distributed to the right and left rear wheels 30*r*, 30*l*. At the time of the non-control state, the drive force is distributed equally to the right and left rear wheels 30*r*, 30*l* as in the alignment chart of FIG. 3. At the time of differential motion limitation, the first and second clutches C1, C2 are engaged as in the alignment chart of FIG. 6, so that the differential motion limitation control can be realized.

Thus, according to the fifth embodiment, the drive force distribution device 80 is able to perform the right-left wheel torque difference control, and is able to perform the differential motion limitation control without a need to increase the size of the first clutch C1 and the second clutch C2, as in the foregoing embodiments.

Furthermore, according to the fifth embodiment, since the speed shift device 82 has a structure that facilitates the disposition of the first clutch C1 and the second clutch C2, the speed shift device 82 contributes to making a practical drive force distribution device 80.

Furthermore, according to the fifth embodiment, since the speed shift device 82 is a double-pinion type planetary gear device, the fourth rotating element RE4 and the second and third rotating elements RE2, RE3 rotate in the same direction, so that the rotation loss reduces. Thus, the speed shift device 82 contributes to making a practical vehicular drive force distribution device 80.

Furthermore, according to the fifth embodiment, since the speed shift device 82 is a speed reducing mechanism, the speed shift device 82 is able to transmit increased torque.

Figure 17:
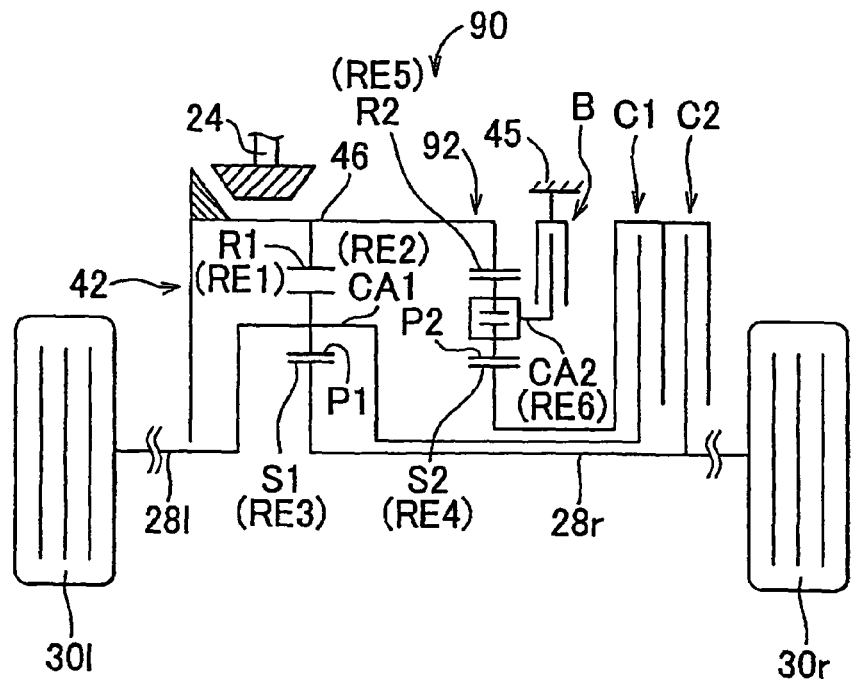
FIG. 17 is a skeleton diagram illustrating a construction of a vehicular drive force distribution device of a sixth embodiment of the invention.

Next, a sixth embodiment of the invention will be described. FIG. 17 is a skeleton diagram of a drive force distribution device 90 of the sixth embodiment of the invention. The drive force distribution device 90 of FIG. 17 is different from the drive force distribution device 26 of FIG. 2 merely in the construction of a speed shift device 92. Other constructions of the drive force distribution device 90 are substantially the same as those of the drive force distribution device 26, and the description thereof will be omitted. The speed shift device 92 in the sixth embodiment corresponds to the speed shift portion in the invention.

The speed shift device 92 is constructed of a double-pinion type planetary gear device that includes a sun gear S2 that is a fourth rotating element RE4, a plurality of pairs of pinions P2 that mesh with each other, a carrier CA2 that is a sixth rotating element RE6 and that supports the pinions P2 so that the pinions P2 are rotatable about their own axes and are also revolvable, and a ring gear R2 that is a fifth rotating element RE5 and that meshes with the sun gear S2 via the pinions P2. The fifth rotating element RE5 is linked to the first rotating element RE1, and functions as an input member of the speed shift device 92. The sixth rotating element RE6 is linked to a torque transfer switching brake B, and is linked selectively to a non-rotating member 45. The fourth rotating element RE4 is selectively linked to a carrier CA1 of the differential device 42 which is a second rotating element RE2, and the left rear wheel axle shaft 28*l*, via the first clutch C1, and is selectively linked to a sun gear S1 of the differential device 42 which is a third rotating element RE3, and the right rear wheel axle shaft 28*r*, via the second clutch C2.

The distribution of the drive force to the right and left rear wheels 30*r*, 30*l* by the drive force distribution device 90 constructed as described above will be described. The drive force generated by the engine 12 is input to the differential device 42 as a drive force that rotates the case 46 of the differential device 42, via the automatic transmission 14, the central differential gear device 22, the propeller shaft 24, etc. Since the ring gear R1 of the differential device 42 is provided integrally with the case 46, the drive force from the propeller shaft 24 is input to the differential device 42 via the ring gear R1. When the torque transfer switching brake B is engaged and the carrier CA2 is locked, the rotation speed of the fourth rotating element RE4 of the speed shift device 92 is increased in the same rotation direction as the rotation direction of the first rotating element RE1, and is thus output. Therefore, the alignment chart at the time of the right-left wheel torque difference control is substantially the same as the alignment charts of FIGS. 14 and 15, and the drive force is appropriately distributed to the right and left rear wheels 30*r*, 30*l*. At the time of the non-control state, the drive force is distributed equally to the right and left rear wheels 30*r*, 30*l* as in the alignment chart of FIG. 3. At the time of differential motion limitation, the first and second clutches C1, C2 are engaged as in the alignment chart of FIG. 6, so that the differential motion limitation is performed.

Thus, according to the sixth embodiment, the drive force distribution device 90 is able to perform the right-left wheel torque difference control, and is able to perform the differential motion limitation control without a need to increase the size of the first clutch C1 and the second clutch C2, as in the foregoing embodiments.

Furthermore, according to the sixth embodiment, since the speed shift device 92 has an arrangement that allows the structurally easy linking to the first rotating element RE1, the speed shift device 92 contributes to making a practical drive force distribution device 90.

Furthermore, according to the sixth embodiment, since the speed shift device 92 is a double-pinion type planetary gear device, the fourth rotating element RE4 and the second and third rotating elements RE2, RE3 rotate in the same direction, so that the rotation loss reduces. Thus, the speed shift device 92 contributes to making a practical vehicular drive force distribution device 90.

Furthermore, according to the sixth embodiment, since the speed shift device, 92 is a speed increasing mechanism, the transmitted torque is reduced, and therefore the friction engagement elements for transmitting the torque can be reduced in size.

Figure 18:
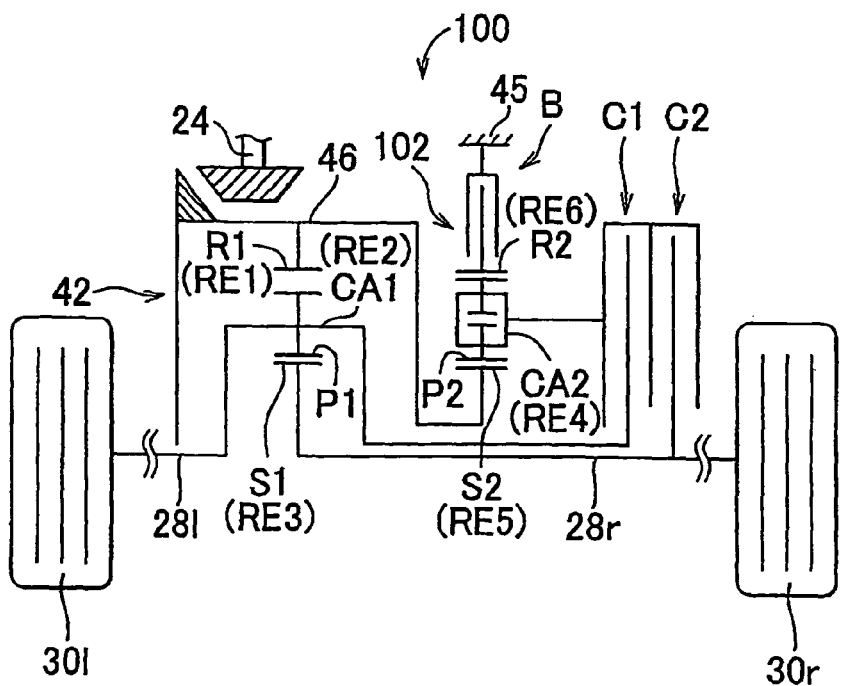
FIG. 18 is a skeleton diagram illustrating a construction of a vehicular drive force distribution device of a seventh embodiment of the invention.

Next a seventh embodiment of the invention will be described. FIG. 18 is a skeleton diagram of a drive force distribution device 100 of the seventh embodiment of the invention. The drive force distribution device 100 of FIG. 18 is different from the drive force distribution device 26 of FIG. 2 merely in the construction of a speed shift device 102. Other constructions of the drive force distribution device 100 are substantially the same as those of the drive force distribution device 26, and the description thereof will be omitted. The speed shift device 102 in the seventh embodiment corresponds to the speed shift portion in the invention.

The speed shift device 102 is constructed of a double-pinion type planetary gear device that includes a sun gear S2 that is a fifth rotating element RE5, a plurality of pairs of pinions P2 that mesh with each other, a carrier CA2 that is a fourth rotating element RE4 and that supports the pinions P2 so that the pinions P2 are rotatable about their own axes and are also revolvable, and a ring gear R2 that is a sixth rotating element RE6 and that meshes with the sun gear S2 via the pinions P2. The fifth rotating element RE5 is linked to the first rotating element RE1, and functions as an input member of the speed shift device 102. The sixth rotating element RE6 is linked to a torque transfer switching brake B, and is linked selectively to a non-rotating member 45. The fourth rotating element RE4 is selectively put into slipping engagement with a carrier CA1 of the differential device 42 which is a second rotating element RE2, and the left rear wheel axle shaft 28*l*, via the first clutch C1, and is selectively put into slipping engagement with a sun gear S1 of the differential device 42 which is a third rotating element RE3, and the right rear wheel axle shaft 28*r*, via the second clutch C2.

The distribution of the drive force to the right and left rear wheels 30*r*, 30*l* by the drive force distribution device 100 constructed as described above will be described. The drive force generated by the engine 12 is input to the differential device 42 as a drive force that rotates the case 46 of the differential device 42, via the automatic transmission 14, the central differential gear device 22, the propeller shaft 24, etc. Since the ring gear R1 of the differential device 42 is provided integrally with the case 46, the drive force from the propeller shaft 24 is input to the differential device 42 via the ring gear R1. When the torque transfer switching brake B is engaged and the ring gear R2 is locked, the rotation speed of the fourth rotating element RE4 of the speed shift device 102 is reduced in the rotation direction opposite to the rotation direction of the first rotating element RE1, and is thus output. Therefore, the alignment chart at the time of the right-left wheel torque difference control is substantially the same as the alignment charts of FIGS. 4 and 5, and the drive force is appropriately distributed to the right and left rear wheels 30*r*, 30*l*. At the time of the non-control state, the drive force is distributed equally to the right and left rear wheels 30*r*, 30*l* as in the alignment chart of FIG. 3. At the time of differential motion limitation, the first and second clutches C1, C2 are engaged as in the alignment chart of FIG. 6, so that the differential motion limitation is performed.

Thus, according to the seventh embodiment, the drive force distribution device 100 is able to perform the right-left wheel torque difference control, and is able to perform the differential motion limitation control without a need to increase the size of the first clutch C1 and the second clutch C2, as in the foregoing embodiments.

Furthermore, according to the seventh embodiment, since the speed shift device 102 structurally facilitates the disposition of the torque transfer switching brake B, the speed shift device 102 contributes to making a practical drive force distribution device 100.

Furthermore, according to the seventh embodiment, since the speed shift device 102 is a double-pinion type planetary gear device, the speed shift device 102 provides relatively great speed change ratio, thus contributing to making a practical drive force distribution device 100.

Furthermore, according to the seventh embodiment, since the speed shift device 102 is a speed reducing mechanism, the speed shift device 102 is able to transmit increased torque.

Figure 19:
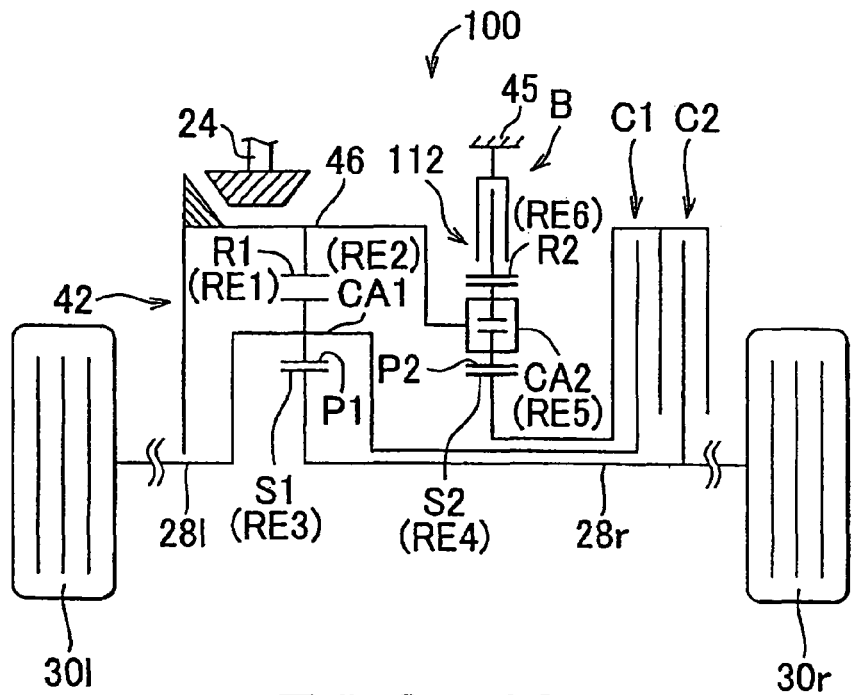
FIG. 19 is a skeleton diagram illustrating a construction of a vehicular drive force distribution device of an eighth embodiment of the invention.

An eighth embodiment of the invention will be described. FIG. 19 is a skeleton diagram of a drive force distribution device 110 of the eighth embodiment of the invention. The drive force distribution device 110 of FIG. 19 is different from the drive force distribution device 26 of FIG. 2 merely in the construction of a speed shift device 112. Other constructions of the drive force distribution device 110 are substantially the same as those of the drive force distribution device 26, and the description thereof will be omitted. The speed shift device 112 in the eighth embodiment corresponds to the speed shift portion in the invention.

The speed shift device 112 is constructed of a double-pinion type planetary gear device that includes a sun gear S2 that is a fourth rotating element RE4, a plurality of pairs of pinions P2 that mesh with each other, a carrier CA2 that is a fifth rotating element RE5 and that supports the pinions P2 so that the pinions P2 are rotatable about their own axes and are also revolvable, and a ring gear R2 that is a sixth rotating element RE6 and that meshes with the sun gear S2 via the pinions P2. The fifth rotating element RE5 is linked to the first rotating element RE1, and functions as an input member of the speed shift device 112. The sixth rotating element RE6 is linked to a torque transfer switching brake B, and is linked selectively to a non-rotating member 45. The fourth rotating element RE4 is selectively put into slipping engagement with a carrier CA1 of the differential device 42' which is a second rotating element RE2, and the left rear wheel axle shaft 28*l*, via the first clutch C1, and is selectively put into slipping engagement with a sun gear S1 of the differential device 42 which is a third rotating element RE3, and the right rear wheel axle shaft 28*r*, via the second clutch C2.

The distribution of the drive force to the right and left rear wheels 30*r*, 30*l* by the drive force distribution device 110 constructed as described above will be described. The drive force generated by the engine 12 is input to the differential device 42 as a drive force that rotates the case 46 of the differential device 42, via the automatic transmission 14, the central differential gear device 22, the propeller shaft 24, etc. Since the ring gear R1 of the differential device 42 is provided integrally with the case 46, the drive force from the propeller shaft 24 is input to the differential device 42 via the ring gear R1. When the torque transfer switching brake B is engaged and the ring gear R2 is locked, the rotation speed of the fourth rotating element RE4 of the speed shift device 112 is increased in the rotation direction opposite to the rotation direction of the first rotating element RE1, and is thus output. Therefore, the alignment chart at the time of the right-left wheel torque difference control is substantially the same as the alignment charts of FIGS. 8 and 9, and the drive force is appropriately distributed to the right and left rear wheels 30r, 30l. At the time of the non-control state, the drive force is distributed equally to the right and left rear wheels 30r, 30l as in the alignment chart of FIG. 3. At the time of differential motion limitation, the first and second clutches C1, C2 are engaged as in the alignment chart of FIG. 6, so that the differential motion limitation is performed.

Thus, according to the eighth embodiment, the drive force distribution device 110 is able to perform the right-left wheel torque difference control, and is able to perform the differential motion limitation control without a need to increase the size of the first clutch C1 and the second clutch C2, as in the foregoing embodiments.

Furthermore, according to the eighth embodiment, since the speed shift device 112 structurally facilitates the disposition of the torque transfer switching brake B, the speed shift device 112 contributes to making a practical drive force distribution device 110.

Furthermore, according to the eighth embodiment, since the speed shift device 112 is a double-pinion type planetary gear device, the speed shift device 112 provides relatively great speed change ratio, thus contributing to making a practical drive force distribution device 110.

Furthermore, according to the eighth embodiment, since the speed shift portion 112 is a speed increasing mechanism, the transmitted torque is reduced, and therefore the friction engagement elements for transmitting the torque can be reduced in size.

Figure 20:
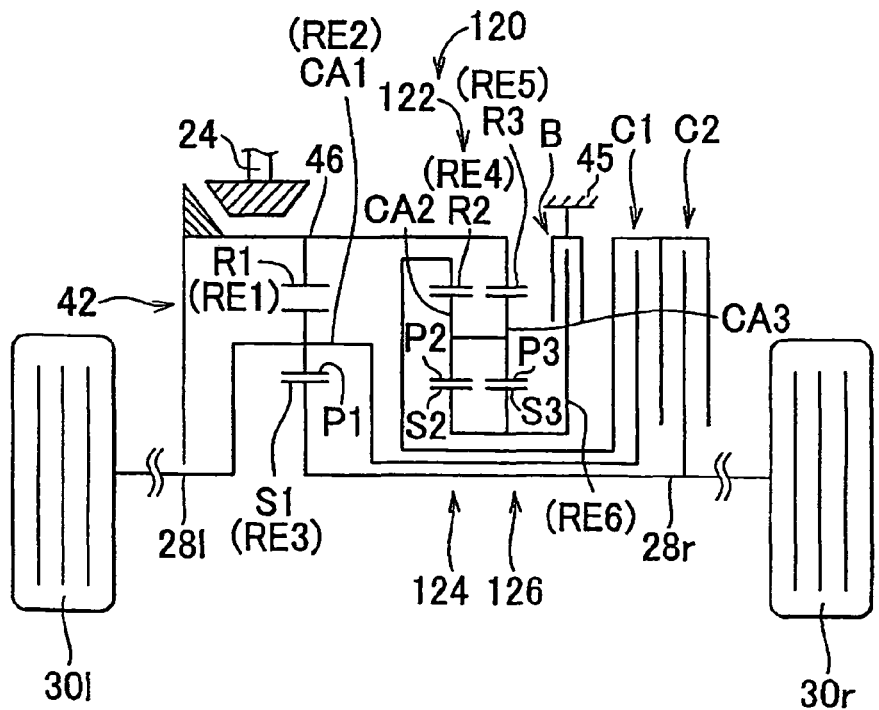
FIG. 20 is a skeleton diagram illustrating a construction of a vehicular drive force distribution device of a ninth embodiment of the invention.

Furthermore, a ninth embodiment of the invention will be described. FIG. 20 is a skeleton diagram of a drive force distribution device 120 of the ninth embodiment of the invention. The drive force distribution device 120 of FIG. 20 is different from the drive force distribution device 26 of FIG. 2 merely in the construction of a speed shift device 122. Other constructions of the drive force distribution device 120 are substantially the same as those of the drive force distribution device 26, and the description thereof will be omitted. The speed shift device 122 in the ninth embodiment corresponds to the speed shift portion in the invention.

The speed shift device 122 is a combination of a pair of a single-pinion type first planetary gear device 124 and a single-pinion type second planetary gear device 126 which are different in gear ratio. The first and second planetary gear devices 124, 126 are disposed coaxially with the drive shaft. A carrier CA2 of the first planetary gear device 124 and a carrier CA3 of the second planetary gear device 126 are integrally linked to each other. A sun gear S2 of the first planetary gear device 124 and a sun gear S3 of the second planetary gear device 126 are integrally linked to each other, and are caused to function as a sixth rotating element RE6. A ring gear R2 of the first planetary gear device 124 is caused to function as a fourth rotating element RE4. A ring gear R3 of the second planetary gear device 126 is caused to function as a fifth rotating element RE5. The fifth rotating element RE5 is linked to the first rotating element RE1, and functions as an input member of the speed shift device 122. The sixth rotating element RE6 is linked to a torque transfer switching brake B and is selectively linked to a non-rotating member 45. The fourth rotating element RE4 is selectively put into slipping engagement with a carrier CA1 of a differential device 42 which is a second rotating element RE2, and a left rear wheel axle shaft 28l, via a first clutch C1. The fourth rotating element RE4 is also selectively put into slipping engagement with a sun gear S1 of the differential device 42 which is a third rotating element RE3, and a right rear wheel axle shaft 28r, via a second clutch C2. Incidentally, the first planetary gear device 124 and the second planetary gear device 126 in the ninth embodiment correspond to a first planetary gear device and a second planetary gear device in the invention.

The distribution of the drive force to the right and left rear wheels 30r, 30l by the drive force distribution device 120 constructed as described above will be described. The drive force generated by the engine 12 is input to the differential device 42 as a drive force that rotates the case 46 of the differential device 42, via the automatic transmission 14, the central differential gear device 22, the propeller shaft 24, etc. Since the ring gear R1 of the differential device 42 is provided integrally with the case 46, the drive force from the propeller shaft 24 is input to the differential device 42 via the ring gear R1. When the torque transfer switching brake B is engaged so that the sixth rotating element RE6 is locked, the rotation of the ring gear R3 of the second planetary gear device 126 is transmitted through the carrier CA3 to the carrier CA2 while being reduced in speed in accordance with the speed change ratio of the second planetary gear device 126. The rotation of the carrier CA2 is transmitted to the fourth rotating element RE4, that is, the ring gear R3, while being increased in speed in accordance with the speed change ratio of the first planetary gear device 124. Thus, the speed change ratio of the whole speed shift device 122 is determined by the multiplication product of the speed change ratio of the first planetary gear device 124 and the speed change ratio of the second planetary gear device 126. Therefore, rotation can be increased or reduced in speed in the same rotation direction in accordance with the speed change ratios of the planetary gear devices 124, 126, and a relatively low speed change ratio can be obtained. Furthermore, the alignment chart at the time of the right-left torque control is substantially the same as in FIGS. 11 and 12 when the speed shift device 122 undergoes speed reduction rotation. On the other hand, when the speed shift device 122 undergoes speed increase rotation, the alignment chart at the time of the right-left torque control is substantially the same as in FIGS. 14 and 15, and drive force is appropriately distributed to the right and left rear wheels 30r, 30l. Furthermore, at the time of non-control, drive force is distributed equally to the right and left rear wheels 30r, 30l as in FIG. 3. At the time of differential motion limitation, the differential motion limitation is performed by engaging the first and second clutches C1, C2 as in FIG. 6.

Thus, according to the ninth embodiment, the drive force distribution device 120 is able to perform the right-left wheel torque difference control, and is able to perform the differential motion limitation control without a need to increase the size of the first clutch C1 and the second clutch C2, as in the foregoing embodiments.

Furthermore, according to the ninth embodiment, since the speed shift device 122 is constructed of two or more planetary gear devices 124, 126, the speed shift device 122 is able to produce relatively low speed change ratio, thus contributing to making a practical drive force distribution device 120.

Figure 21:
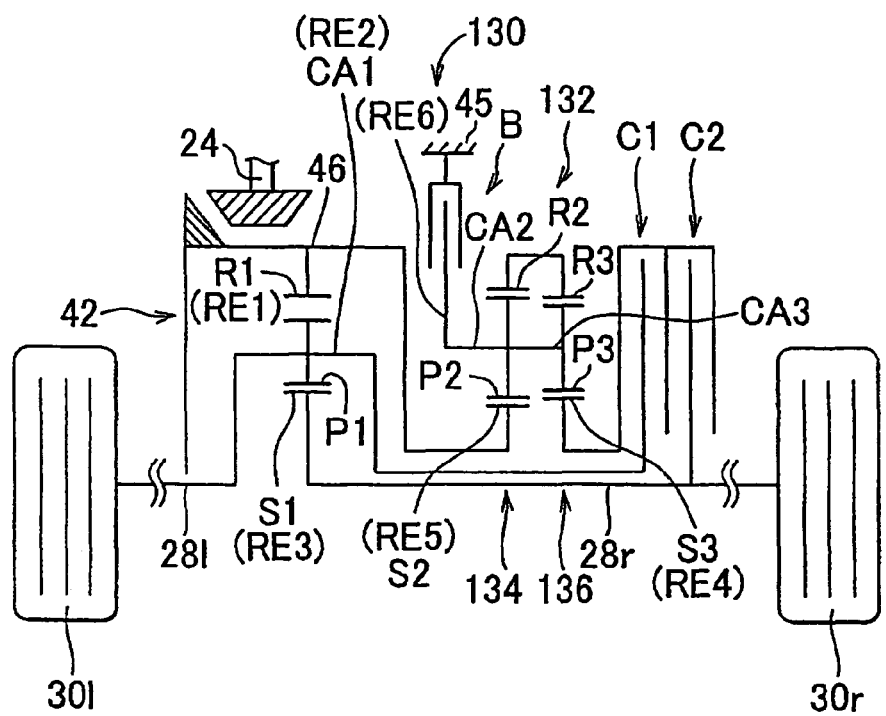
FIG. 21 is a skeleton diagram illustrating a construction of a vehicular drive force distribution device of a tenth embodiment of the invention.

Furthermore, a tenth embodiment of the invention will be described. FIG. 21 is a skeleton diagram of a drive force distribution device 130 of the tenth embodiment of the invention. The drive force distribution device 130 of FIG. 21 is different from the drive force distribution device 26 of FIG. 2 merely in the construction of a speed shift device 132. Other constructions of the drive force distribution device 130 are substantially the same as those of the drive force distribution device 26, and the description thereof will be omitted. The speed shift device 132 in the tenth embodiment corresponds to the speed shift portion in the invention.

The speed shift device 132 is constructed of a pair of a single-pinion type first planetary gear device 134 and a single-pinion type second planetary gear device 136 which are different in gear ratio. The first and second planetary gear devices 134, 136 are disposed coaxially with the drive shaft. A ring gear R2 of the first planetary gear device 134 and a ring gear R3 of the second planetary gear device 136 are linked to each other. A sun gear S2 of the first planetary gear device 134 is caused to function as a fifth rotating element RE5. A carrier CA2 of the first planetary gear device 134 and a carrier CA3 of the second planetary gear device 136 are integrally linked to each other, and are therefore caused to function as a sixth rotating element RE6. A sun gear S3 of the second planetary gear device 136 is caused to function as a fourth rotating element RE4. The fifth rotating element RE5 is linked to the first rotating element RE1, and functions as an input member of the speed shift device 132. The sixth rotating element RE6 is linked to a torque transfer switching brake B, and is selectively linked to a non-rotating member 45. The fourth rotating element RE4 is selectively put into slipping engagement with a carrier CA1 of a differential device 42 which is a second rotating element RE2, and a left rear wheel axle shaft 28*l*, via a first clutch C1. The fourth rotating element RE4 is also selectively put into slipping engagement with a sun gear S1 of the differential device 42 which is a third rotating element RE3, and a right rear wheel axle shaft 28*r*, via a second clutch C2. Incidentally, the first planetary gear device 134 and the second planetary gear device 136 in the tenth embodiment correspond to a first planetary gear device and a second planetary gear device in the invention.

The distribution of the drive force to the right and left rear wheels 30*r*, 30*l* by the drive force distribution device 130 constructed as described above will be described. The drive force generated by the engine 12 is input to the differential device 42 as a drive force that rotates the case 46 of the differential device 42, via the automatic transmission 14, the central differential gear device 22, the propeller shaft 24, etc. Since the ring gear R1 of the differential device 42 is provided integrally with the case 46, the drive force from the propeller shaft 24 is input to the differential device 42 via the ring gear R1. When the torque transfer switching brake B is engaged so that the sixth rotating element RE6 is locked, the rotation of the sun gear S2 of the first planetary gear device 134 is output to the ring gear R2 of the first planetary gear device 134 while being reduced in speed in accordance with the speed change ratio of the first planetary gear device 134. The rotation of the ring gear R2 is input to the ring gear R3 of the second planetary gear device 136, and is output to the sun gear S3 of the second planetary gear device 136 while being increased in speed in accordance with the speed change ratio of the second planetary gear device 136. It is to be noted herein that in the tenth embodiment, setting is made such that the multiplication product of the speed change ratio $\rho 1$ ($\rho 1 > 1.0$) of the first planetary gear device 134 and the speed change ratio $\rho 2$ ($\rho 2 < 1.0$) of the second planetary gear device 136 is greater than 1.0, and the rotation of the fifth rotating element RE5 (the sun gear S2) is transmitted to the fourth rotating element RE4 (the sun gear S3) in the same rotation direction while being reduced in speed. Therefore, at the time of the right-left torque control, the alignment chart is substantially the same as in FIGS. 11 and 12, and drive force is appropriately distributed to the right and left rear wheels 30*r*, 30*l*. Furthermore, at the time of non-control, drive force is distributed equally to the right and left rear wheels 30*r*, 30*l* as in FIG. 3. At the time of differential motion limitation, the differential motion limitation is performed by engaging the first and second clutches C1, C2 as in FIG. 6.

Thus, according to the tenth embodiment, the drive force distribution device 130 is able to perform the right-left wheel torque difference control, and is able to perform the differential motion limitation control without a need to increase the size of the first clutch C1 and the second clutch C2, as in the foregoing embodiments.

Furthermore, according to the tenth embodiment, since the speed shift device 132 is constructed of two or more planetary gear devices 134, 136, the speed shift device 132 is able to produce relatively low speed change ratio, thus contributing to making a practical drive force distribution device 130.

Figure 22:
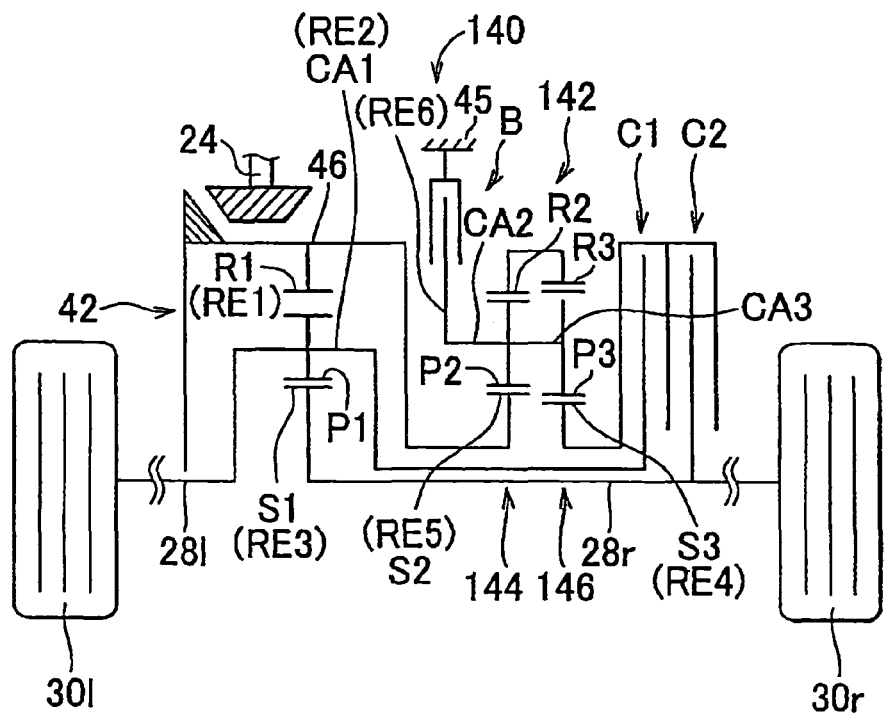
FIG. 22 is a skeleton diagram illustrating a construction of a vehicular drive force distribution device of an eleventh embodiment of the invention.

Furthermore, an eleventh embodiment of the invention will be described. FIG. 22 is a skeleton diagram of a drive force distribution device 140 of the eleventh embodiment of the invention. The drive force distribution device 140 of FIG. 22 is different from the drive force distribution device 26 of FIG. 2 merely in the construction of a speed shift device 142. Other constructions of the drive force distribution device 140 are substantially the same as those of the drive force distribution device 26, and the description thereof will be omitted. The speed shift device 142 in the eleventh embodiment corresponds to the speed shift portion in the invention.

The speed shift device 142 is constructed of a pair of a single-pinion type first planetary gear device 144 and a single-pinion type second planetary gear device 146 which are different in gear ratio. The first and second planetary gear devices 144, 146 are disposed coaxially with the drive shaft. A ring gear R2 of the first planetary gear device 144 and a ring gear R3 of the second planetary gear device 146 are linked to each other. A sun gear S2 of the first planetary gear device 144 is caused to function as a fifth rotating element RE5. A carrier CA2 of the first planetary gear device 144 and a carrier CA3 of the second planetary gear device 146 are integrally linked to each other, and are therefore caused to function as a sixth rotating element RE6. A sun gear S3 of the second planetary gear device 146 is caused to function as a fourth rotating element RE4. The fifth rotating element RE5 is linked to the first rotating element RE1, and functions as an input member of the speed shift device 142. The sixth rotating element RE6 is linked to a torque transfer switching brake B, and is selectively linked to a non-rotating member 45. The fourth rotating element RE4 is selectively put into slipping engagement with a carrier CA1 of a differential device 42 which is a second rotating element RE2, and a left rear wheel axle shaft 28*l*, via a first clutch C1. The fourth rotating element RE4 is also selectively put into slipping engagement with a sun gear S1 of the differential device 42 which is a third rotating element RE3, and a right rear wheel axle shaft 28*r*, via a second clutch C2. Incidentally, the first planetary gear device 144 and the second planetary gear device 146 in the eleventh embodiment correspond to a first planetary gear device and a second planetary gear device in the invention.

The distribution of the drive force to the right and left rear wheels 30*r*, 30*l* by the drive force distribution device 140 constructed as described above will be described. The drive force generated by the engine 12 is input to the differential device 42 as a drive force that rotates the case 46 of the differential device 42, via the automatic transmission 14, the central differential gear device 22, the propeller shaft 24, etc. Since the ring gear R1 of the differential device 42 is provided integrally with the case 46, the drive force from the propeller shaft 24 is input to the differential device 42 via the ring gear R1. When the torque transfer switching brake B is engaged so that the sixth rotating element RE6 is locked, the rotation of the sun gear S2 of the first planetary gear device 144 is output to the ring gear R2 of the first planetary gear device 144 while being reduced in speed in accordance with the speed change ratio of the first planetary gear device 144. The rotation of the ring gear R2 is input to the ring gear R3 of the second planetary gear device 146, and is output to the sun gear S3 of the second planetary gear device 146 while being increased in speed in accordance with the speed change ratio of the second planetary gear device 146. It is to be noted herein that in the eleventh embodiment, setting is made such that the multiplication product of the speed change ratio $\rho1$ ($\rho1>1.0$) of the first planetary gear device 144 and the speed change ratio $\rho2$ ($\rho2<1.0$) of the second planetary gear device 146 is smaller than 1.0, and the rotation of the fifth rotating element RE5 (the sun gear S2) is transmitted to the fourth rotating element RE4 (the sun gear S3) in the same rotation direction while being increased in speed. Therefore, at the time of the right-left torque control, the alignment chart is substantially the same as in FIGS. 14 and 15, and drive force is appropriately distributed to the right and left rear wheels 30r, 30l. Furthermore, at the time of non-control, drive force is distributed equally to the right and left rear wheels 30r, 30l as in FIG. 3. At the time of differential motion limitation, the differential motion limitation is performed by engaging the first and second clutches C1, C2 as in FIG. 6.

Thus, according to the eleventh embodiment, the drive force distribution device 140 is able to perform the right-left wheel torque difference control, and is able to perform the differential motion limitation control without a need to increase the size of the first clutch C1 and the second clutch C2, as in the foregoing embodiments.

Furthermore, according to the eleventh embodiment, since the speed shift device 142 is constructed of two or more planetary gear devices 144, 146, the speed shift device 142 is able to produce relatively low speed change ratio, thus contributing to making a practical drive force distribution device 140.

While the embodiments of the invention have been described in detail with reference to the drawings, the invention is also applicable in other manners.

For example, although the foregoing embodiments have been described in conjunction with a case where the drive force distribution device 26 or the like is applied to a front-rear-wheel drive vehicle based on a front-mounted engine front-wheel drive configuration, the invention is not limited by this configuration, but is also appropriately applicable to various types of vehicles, such as front-mounted engine front-wheel drive (FF) vehicles, front-mounted engine rear-wheel drive (FR) vehicles, and front-rear-wheel drive vehicles based on a front-mounted engine rear-wheel drive vehicle configuration.

Although, in the foregoing embodiments, the drive source is an internal combustion engine, such as a gasoline engine, a diesel engine, etc., the drive source is not limited to an internal combustion engine, but may also be other drive sources, such as an electric motor or the like.

Furthermore, although in the foregoing embodiments, the speed shift device 44 or the like is constructed of one or two planetary gear devices, the speed shift device 44 or the like may have any construction as long as the rotation of the fifth rotating element RE5 can be shifted in speed. The speed shift device 44 or the like may have any of various types of constructions, such as a construction that includes three or more planetary gear devices, a construction that includes a double-pinion type planetary gear device and a single-pinion type planetary gear device, etc. Furthermore, the linkage relationship between the sun gears, the carriers and the ring gears of the planetary gear devices can be freely altered as long as the linkage relationship is appropriate. The position of the torque transfer switching brake B can be freely altered as long as the position is appropriate.

Furthermore, although in the foregoing embodiments, the control device 36 selectively executes the right-left wheel torque difference control and the differential motion limitation control in accordance with the signals supplied from various sensors, that is, in accordance with the state of run of the vehicle, it is also allowable to adopt a construction that allows a driver to select a desired one of the controls through the use of a switch or the like.

Furthermore, in the foregoing embodiments, the differential device 42 is constructed of a double-pinion type planetary gear device, it is appropriate if the differential device 42 includes a planetary gear device made up of a first rotating element RE1, a second rotating element RE2 and a third rotating element RE3. For example, a differential device that includes a single-pinion type planetary gear device is also allowable.

Furthermore, in the foregoing embodiments, the right-left positional relationships between the left rear wheel axle shaft 28l and the right rear wheel axle shaft 28r of the rear wheel axle shafts 28 and between the left rear wheel 30l and the right rear wheel 30r of the rear wheels 30 are not particularly limited. That is, the invention can also be carried out in a situation where the foregoing components are reversed in the right-left position.

Furthermore, although in the foregoing embodiments, the sixth rotating element RE6 is locked by the torque transfer switching brake B, the invention can also be carried out in a situation where the torque transfer switching brake B is half engaged.

Furthermore, although in the foregoing embodiments, the first clutch C1, the second clutch C2 and the torque transfer switching brake B are hydraulically driven, the invention can also be carried out if other types of clutch devices and brake devices, for example, electromagnetic clutches and the like, are used.

It is to be understood that what are described above are mere embodiments of the invention, and the invention can be carried out with various modifications and improvements based on the knowledge of those of ordinary skill in the art.

The invention claimed is:

1. A vehicular drive force distribution device that distributes drive force generated by a drive source to right and left driving wheels, comprising:
    a differential portion having a first rotating element to which the drive force generated by the drive source is transmitted, a second rotating element connected to one of the right and left driving wheels, and a third rotating element connected to another one of the right and left driving wheels;
    a speed shift portion that shifts a speed of rotation of the first rotating element and selectively outputs rotation from a fourth rotating element;
    a first clutch that transmits the rotation from the fourth rotating element to the second rotating element so that an amount of torque transmitted is variable; and
    a second clutch that transmits the rotation from the fourth rotating element to the third rotating element so that the amount of torque transmitted is variable,
    wherein the speed shift portion includes a planetary gear device that includes the fourth rotating element, a fifth rotating element linked to the first rotating element, and a sixth rotating element, and the speed shift portion includes a brake capable of braking rotation of the sixth rotating element, and wherein the speed shift portion is capable of changing the amount of torque transmitted to the fourth rotating element, using the brake.

2. The vehicular drive force distribution device according to claim 1, wherein in the speed shift portion, the fourth rotating element is a ring gear, the fifth rotating element is a sun gear, and the sixth rotating element is a carrier which rotatably supports pinions that mesh with the ring gear and the sun gear, and which is selectively linked to a non-rotating member via the brake.

3. The vehicular drive force distribution device according to claim 2, wherein the planetary gear device of the speed shift portion is a single-pinion type planetary gear device.

4. The vehicular drive force distribution device according to claim 2, wherein the planetary gear device of the speed shift portion is a double-pinion type planetary gear device.

5. The vehicular drive force distribution device according to claim 1, wherein in the speed shift portion, the fourth rotating element is a sun gear, the fifth rotating element is a ring gear, and the sixth rotating element is a carrier which rotatably supports pinions that mesh with the ring gear and the sun gear, and which is selectively linked to a non-rotating member via the brake.

6. The vehicular drive force distribution device according to claim 5, wherein the planetary gear device of the speed shift portion is a single-pinion type planetary gear device.

7. The vehicular drive force distribution device according to claim 1, wherein the planetary gear device of the speed shift portion is a double-pinion type planetary gear device.

8. The vehicular drive force distribution device according to claim 1, wherein in the speed shift portion, the fourth rotating element is a carrier which rotatably supports pinions that mesh with a ring gear and a sun gear, the fifth rotating element is the sun gear, and the sixth rotating element is the ring gear that is selectively linked to a non-rotating member via the brake.

9. The vehicular drive force distribution device according to claim 8, wherein the planetary gear device of the speed shift portion is a single-pinion type planetary gear device.

10. The vehicular drive force distribution device according to claim 8, wherein the planetary gear device of the speed shift portion is a double-pinion type planetary gear device.

11. The vehicular drive force distribution device according to claim 1, wherein in the speed shift portion, the fourth rotating element is a sun gear, and the fifth rotating element is a carrier that rotatably supports pinions that mesh with a ring gear and the sun gear, and the sixth rotating element is the ring gear that is selectively linked to a non-rotating member via the brake.

12. The vehicular drive force distribution device according to claim 11, wherein the planetary gear device of the speed shift portion is a single-pinion type planetary gear device.

13. The vehicular drive force distribution device according to claim 11, wherein the planetary gear device of the speed shift portion is a double-pinion type planetary gear device.

14. The vehicular drive force distribution device according to claim 1, wherein the speed shift portion includes two or more planetary gear devices that include the fourth rotating element, the fifth rotating element linked to the first rotating element, the sixth rotating element, and the speed shift portion includes the brake capable of braking rotation of the sixth rotating element.

15. The vehicular drive force distribution device according to claim 14, wherein the two or more planetary gear devices include a single-pinion type first planetary gear device and a single-pinion type second planetary gear device, the fourth rotating element is a ring gear of the first planetary gear device, and the fifth rotating element is a ring gear of the second planetary gear device, and the sixth rotating element is a sun gear of the first planetary gear device and a sun gear of the second planetary gear device that are linked to each other, and a carrier of the first planetary gear device and a carrier of the second planetary gear device are linked to each other.

16. The vehicular drive force distribution device according to claim 14, wherein the two or more planetary gear devices include a single-pinion type first planetary gear device and a single-pinion type second planetary gear device, the fourth rotating element is a sun gear of the second planetary gear device, the fifth rotating element is a sun gear of the first planetary gear device, the sixth rotating element is a carrier of the first planetary gear device and a carrier of the second planetary gear device that are linked to each other, and a ring gear of the first planetary gear device and a ring gear of the second planetary gear device are linked to each other.

17. The vehicular drive force distribution device according to claim 6, wherein the speed shift portion is a speed increasing mechanism.

18. The vehicular drive force distribution device according to claim 3, wherein the speed shift portion is a speed reducing mechanism.

19. The vehicular drive force distribution device according to claim 1, wherein the differential portion is a double-pinion type planetary gear device, the first rotating element is a ring gear, the second rotating element is a carrier, and the third rotating element is a sun gear.

20. The vehicular drive force distribution device according to claim 7, wherein the speed shift portion is a speed increasing mechanism.

21. The vehicular drive force distribution device according to claim 12, wherein the speed shift portion is a speed increasing mechanism.

22. The vehicular drive force distribution device according to claim 13, wherein the speed shift portion is a speed increasing mechanism.

23. The vehicular drive force distribution device according to claim 14, wherein the speed shift portion is a speed increasing mechanism.

24. The vehicular drive force distribution device according to claim 4, wherein the speed shift portion is a speed reducing mechanism.

25. The vehicular drive force distribution device according to claim 9, wherein the speed shift portion is a speed reducing mechanism.

26. The vehicular drive force distribution device according to claim 10, wherein the speed shift portion is a speed reducing mechanism.

27. The vehicular drive force distribution device according to claim 14, wherein the speed shift portion is a speed reducing mechanism.

* * * * *